US009550557B2

(12) United States Patent
Lee et al.

(10) Patent No.: US 9,550,557 B2
(45) Date of Patent: Jan. 24, 2017

(54) MULTICAGE-TYPE DEVICE FOR FILTERING BALLAST WATER SO AS TO PREVENT BACK PRESSURE ON BACKWASH LINE

(75) Inventors: Soo-Tae Lee, Busan (KR); Tae-Sung Pyo, Busan (KR); Su-Kyu Lee, Busan (KR)

(73) Assignee: Panasia Co., Ltd., Busan (KR)

( * ) Notice: Subject to any disclaimer, the term of this patent is extended or adjusted under 35 U.S.C. 154(b) by 0 days.

(21) Appl. No.: 14/351,635

(22) PCT Filed: Oct. 20, 2011

(86) PCT No.: PCT/KR2011/007825
§ 371 (c)(1),
(2), (4) Date: Apr. 14, 2014

(87) PCT Pub. No.: WO2013/054968
PCT Pub. Date: Apr. 18, 2013

(65) Prior Publication Data
US 2014/0231320 A1    Aug. 21, 2014

(30) Foreign Application Priority Data

Oct. 14, 2011    (KR) .................. 10-2011-0105496

(51) Int. Cl.
*B01D 29/68*    (2006.01)
*B01D 29/52*    (2006.01)
(Continued)

(52) U.S. Cl.
CPC .............. *B63J 4/002* (2013.01); *B01D 29/117* (2013.01); *B01D 29/52* (2013.01); *B01D 29/682* (2013.01);
(Continued)

(58) Field of Classification Search
CPC ....... B01D 29/60; B01D 29/62; B01D 35/143; C02F 1/32; C02F 103/08
(Continued)

(56) References Cited

U.S. PATENT DOCUMENTS 2,835,390 A  *  5/1958  King ............................ 210/411
5,364,539 A  *  11/1994  Castagno et al. ............. 210/768
(Continued)

FOREIGN PATENT DOCUMENTS

KR    10-2004-0089010 A    10/2004
KR    10-2006-0118987 A    11/2006
(Continued)

OTHER PUBLICATIONS

International Search Report dated Oct. 29, 2012, issued in PCT Application No. PCT/KR2011/007825, filed Oct. 20, 2011.
(Continued)

Primary Examiner — Robert Clemente
Assistant Examiner — Akash Varma
(74) Attorney, Agent, or Firm — Workman Nydegger

(57) ABSTRACT

A filtering device for treating ballast water and more particularly, a multicage-type device for filtering ballast water to prevent back pressure, wherein the multicage-type device for filtering ballast water includes a back pressure prevention tank on a backwash line for backwashing and discharging foreign substances that are inside a filter of the device for filtering, so that backwash water and the foreign substances in the backwash line are preliminarily stored in the back pressure prevention tank thereby preventing an increase of back pressure and preventing an increase of the back pressure on the backwash line by always maintaining a level of water inside the back pressure prevention tank at lower than an inlet port that is connected to the backwash line.

17 Claims, 13 Drawing Sheets

(51) Int. Cl.
*B63J 4/00* (2006.01)
*B01D 29/11* (2006.01)
*C02F 103/00* (2006.01)

(52) U.S. Cl.
CPC ....... *B01D 29/684* (2013.01); *B01D 2201/082* (2013.01); *C02F 2103/008* (2013.01)

(58) Field of Classification Search
USPC .............................. 210/90, 251, 85, 741, 108
See application file for complete search history.

(56) References Cited

U.S. PATENT DOCUMENTS

| | | | | |
|---|---|---|---|---|
| 6,171,508 | B1* | 1/2001 | Browning, Jr. | 210/750 |
| 8,002,993 | B2* | 8/2011 | Gold et al. | 210/748.11 |
| 2005/0126963 | A1* | 6/2005 | Phagoo et al. | 210/110 |
| 2007/0262029 | A1* | 11/2007 | Yoshida et al. | 210/741 |
| 2008/0190826 | A1* | 8/2008 | Miner et al. | 210/98 |
| 2009/0173677 | A1* | 7/2009 | Seura | 210/138 |
| 2010/0116647 | A1* | 5/2010 | Kornmuller et al. | 204/228.1 |
| 2011/0226681 | A1* | 9/2011 | Lee et al. | 210/90 |
| 2011/0303591 | A1* | 12/2011 | Lee | B01D 29/117 210/106 |

FOREIGN PATENT DOCUMENTS

| | | |
|---|---|---|
| KR | 10-2009-0067624 A | 6/2009 |
| KR | 10-0916650 B1 | 9/2009 |
| KR | 2010/003967 * | 6/2010 |
| KR | 10-1012753 B1 | 2/2011 |
| WO | WO 2010062032 A2 * | 6/2010 ...................... 210/90 |

OTHER PUBLICATIONS

Written Opinion dated Oct. 24, 2012, issued in PCT Application No. PCT/KR2011/007825, filed Oct. 20, 2011.

* cited by examiner

MULTICAGE-TYPE DEVICE FOR FILTERING BALLAST WATER SO AS TO PREVENT BACK PRESSURE ON BACKWASH LINE

TECHNICAL FIELD

The present invention relates, in general, to filtering devices for treating ballast water by means of a filtration method and, more particularly, to a multi-cage type ballast water filtering device having a back pressure prevention structure which includes a back pressure prevention tank installed on a backwash line through which backwash water used to backwash filters to remove foreign substances from the filters is discharged out of the filtering device, so that backwash water and foreign substances that flow along the backwash line are primarily stored in the back pressure prevention tank, thus preventing back pressure in the backwash line from increasing, and in which the water level in the back pressure prevention tank can be always maintained lower than an inlet connected to the backwash line so that the back pressure in the backwash line can be prevented from increasing, and when the water level in the back pressure prevention tank that is measured by a water level sensor is a predetermined level or more, backwash water stored in the tank is forcibly drained by a pump so that the water level in the tank can be always maintained in a predetermined level or less.

BACKGROUND ART

Ballast water refers to sea water which is charged into a ballast tank of a ship to maintain balance of the ship when the ship sails without cargo.

As marine transportation rates have gradually increased along with an increase in international trade, the number of ships used has increased, and the ships used are becoming larger. As a result, the amount of ballast water used in ships has greatly increased. As the amount of ballast water used in ships is increased, occurrence of damage to indigenous ocean ecosystems attributable to foreign marine creature species is also increased. To solve such international environmental issues, in 2004, IMO (international maritime organization) established 'International convention for the control and management for ship's ballast water and sediments'. Since 2009, ballast water treatment devices have been obligatorily installed in new constructed ships.

As examples of conventional methods for treating ballast water, a method of exchanging ballast water on the sea and a method of treating ballast water on the ground have been used. However, these conventional methods have the disadvantage of being inefficient. Therefore, recently, a method using a ballast water treatment device installed in a ship is widely used. Particularly, a filtration method using a filter is mainly used as the ballast water treatment device. As ships are becoming larger, a need for treatment of a large amount of ballast water is increased. Accordingly, multi-cage type ballast water filtering devices which can treat a large amount of ballast water are recently used.

The term 'multi-cage type ballast water filtering device' refers to a device in which a plurality of filtering units, each of which includes a filter and a device for automatically washing the filter integrated into a single body in a filtering device. As multiple filtering units are used, ballast water treatment capacity is increased accordingly. Therefore, such a multi-cage type ballast water filtering device is mainly used in a large ship which must treat a large capacity of ballast water.

FIG. 1 is a side view of a conventional multi-cage type ballast water filtering device. FIG. 2 is a plan view of the conventional multi-cage type ballast water filtering device.

The conventional multi-cage type ballast water filtering device has a structure capable of automatically backwashing filters to remove foreign substances, etc. from the filters and discharging them out of the device. However, the conventional filtering device is problematic in that foreign substances, etc. are deposited on a backwash line during a backwashing process and back pressure attributable to the deposited foreign substances, etc. is increased, whereby the backwashing process may not be smoothly conducted. Also, there was no effort to fundamentally overcome such problems.

Furthermore, as shown in FIGS. 1 and 2, in the conventional filtering device, not only drive units a which operate backwash devices for backwashing filtering units but also discharge units b and discharge pipes c for discharging foreign substances out of the filtering device after the backwashing process all are installed on an upper part of the filtering device. As such, because many elements are gathered in one place, work for installation, replacement or disassembly of the elements is not easy. Particularly, under special environment conditions, that is, in a ship, space provided to install such a filtering device is very small (generally, to ensure sufficient space for original purposes of the ship, it is designed such that space such as a machinery room is relatively small). Therefore, given the fact that space defined above the upper part of the filtering device is also small, the conventional structure in which installation positions of many elements are focused on the upper part of the filtering device makes the maintenance of the filtering device more difficult.

In addition, the more the installation positions of the elements of the filtering device are focused on the upper part of the filter device, the more the space required above the upper part of the filtering device to install the elements or allow disassembly work must also be increased. Thus, an inefficient spatial structure is caused in that a separate upper space for the filtering device must be secured under special environment conditions, that is, in the ship.

Furthermore, in the conventional filtering device, if backwash water and foreign substances that have moved along the backwash line settle in a pipe of the backwash line when the force with which backwash water and foreign substances flow along the backwash line becomes insufficient, or if backwash water is concentrated in the backwash line, the degree of opening of the pipe of the backwash line is reduced. In this case, pressure in the backwash line, that is, back pressure, increases, thus reducing the backwashing efficiency and the filtering efficiency of the filtering device. However, the conventional filtering device has no technical structure to solve these problems.

Moreover, the conventional filtering device does not sufficiently have a means for fundamentally preventing the elements used in the backwash devices from colliding with each other or with deposited foreign substances and being damaged during a process of backwashing the filtering units. In addition, the conventional filtering device does not have any technical structure to solve problems derived from ballast water that remains in the filtering device while the operation thereof is interrupted, or problems pertaining to a seal of the filter for preventing ballast water that has not been filtered from leaking out of the filter.

DISCLOSURE

Technical Problem

Accordingly, the present invention has been made keeping in mind the above problems occurring in the prior art, and an object of the present invention is to provide a multi-cage type ballast water filtering device having a back pressure prevention structure which includes a back pressure prevention tank installed on a backwash line through which backwash water used to backwash filters to remove foreign substances from the filters is discharged out of the filtering device, so that backwash water and foreign substances that flow along the backwash line are primarily stored in the back pressure prevention tank, thus preventing back pressure in the backwash line from increasing.

Another object of the present invention is to provide a multi-cage type ballast water filtering device having a back pressure prevention structure, in which the water level in the back pressure prevention tank can be always maintained lower than an inlet connected to the backwash line so that the back pressure in the backwash line can be prevented from increasing.

A further object of the present invention is to provide a multi-cage type ballast water filtering device having a back pressure prevention structure, in which when the water level in the back pressure prevention tank that is measured by a water level sensor is a predetermined level or more, backwash water stored in the tank is forcibly drained by a pump so that the water level in the tank can be always maintained at a predetermined level or less.

Yet another object of the present invention is to provide a multi-cage type ballast water filtering device having a back pressure prevention structure, in which given special installation conditions of the filtering device used in a ship, among the elements the installation positions of which have been focused on the upper part of the filter device in the conventional technique, a discharge unit and a backwash line for discharging foreign substances out of the filtering device after backwashing the filters are relocated to a lower part of the filtering device, and discharge pipes of filtering units communicate with each other to form a single line, whereby the structure of the filtering device can be simplified, space required to install the elements above the upper part of the filtering device can be reduced, and discharge of foreign substances and back pressure of the filtering units can be integrally and effectively controlled.

Still another object of the present invention is to provide a multi-cage type ballast water filtering device having a back pressure prevention structure which includes double or triple structures for fundamentally preventing elements of automatic washing units that move upwards and downwards to backwash filters of the filtering units from colliding with each other and being damaged, thus preventing the filtering device from being damaged, and enhancing the durability of the filtering device.

Still another object of the present invention is to provide a multi-cage type ballast water filtering device having a back pressure prevention structure in which when backwashing the filter of each filtering unit, a moving path of a suction unit of the filtering unit that sucks foreign substances from the filter can cover all areas of the inner surface of the filter such that some foreign substances are prevented from remaining on the filter around the moving path, and in which when the filtering device is not in operation, all ballast water is completely discharged out of the filtering device, and which is configured such that a seal of the filter can be reliably created, and a desired element can be easily replaced with another.

Technical Solution

In order to accomplish the above objects, in an embodiment, the present invention provides a multi-cage type ballast water filtering device having a back pressure prevention structure, including: a body having an inlet port and an outlet port through which ballast water is drawn into and discharged from the body; and a plurality of filtering units connected to each other to form a packaged structure in the body, wherein each of the filtering units comprises: a filter filtering ballast water that flows through the body; and an automatic washing unit backwashing the filter to remove foreign substances adhering to the filter, the automatic washing unit include: a drive unit operating the automatic washing unit in response to a signal of a control unit; a suction unit connected to and moved by the drive unit, the suction unit sucking the foreign substances from the filter; and a discharge unit discharging the foreign substances sucked by the suction unit, and the discharge unit include a back pressure prevention tank provided on a backwash line so that backwash water and foreign substances drawn into the backwash line are primarily stored in the back pressure prevention tank, whereby back pressure in the backwash line is prevented from increasing.

In another embodiment, the back pressure prevention tank may be provided on the single backwash line formed by communicating discharge pipes of the filtering units with each other below the body.

In a further embodiment, the back pressure prevention tank may be configured such that an outlet through which backwash water is discharged from the back pressure prevention tank is disposed lower than an inlet through which backwash water is drawn into the back pressure prevention tank, whereby a water level in the back pressure prevention tank is maintained lower than the inlet so as to prevent the back pressure in the backwash line from increasing.

In yet another embodiment, the back pressure prevention tank may include: a water level sensor measuring the water level in the tank; and a pump discharging backwash water from the back pressure prevention tank when the water level measured by the water level sensor is a predetermined level or more, whereby the water level in the tank is maintained at the predetermined level or less so as to prevent the back pressure in the backwash line from increasing.

In still another embodiment, the suction unit may include a suction rod sucking the foreign substances adhering to the filter, and a core connected to the suction rod and functioning as a rotating shaft for rotating the suction rod, with a stopper provided at a predetermined position on the core so that when the stopper comes into contact with the body, vertical movement of the core is limited, whereby the suction rod is prevented from colliding with the body and being damaged.

In still another embodiment, a bushing may be provided on a portion of the body that is brought into contact with the stopper, wherein the stopper is made of metal, and the bushing is made of nonmetal, whereby the stopper or the body is prevented from being damaged due to a contact between the stopper and the body.

In still another embodiment, the drive unit may include: a drive shaft rotated and vertically moved by a drive motor; a contact means provided at a predetermined position on the drive shaft; a pair of first limit switches provided at positions spaced apart from each other by a predetermined distance corresponding to a vertical movement distance range of the suction unit, the first limit switches being brought into contact with the contact means; and a pair of second limit switches respectively provided at positions higher and lower than the first limit switches with a spacing distance greater than the spacing distance between the first limit switches, the second limit switches setting a vertical movement limit section of the suction unit, wherein when the contact means moves over the spacing distance between the first limit switches, the second limit switches double-limit the movement of the suction unit so that the suction unit is prevented from colliding with the body and being damaged.

In still another embodiment, the second limit switches may be disposed facing the respective first limit switches so that even when a vertical spacing distance between each of the first limit switches and the corresponding second limit switch is small, the second limit switch can correctly sense the contact means.

In still another embodiment, the suction unit may include: a suction rod sucking the foreign substances adhering to the filter; and a core connected to the suction rod and functioning as a rotating shaft interlocked with the drive unit to rotate the suction rod, wherein the suction rod has a suction hole having a diameter substantially equal to or greater than a lead to which the suction rod vertically moves when making a turn, whereby the suction rod rotates around the core and is able to backwash all portions of an inner surface of the filter to remove the foreign substances from the filter in such a way that backwashed portions are partially overlapped with each other, thus enhancing filter backwashing efficiency and preventing the suction rod from being damaged.

In still another embodiment, the multi-cage type ballast water filtering device may further include: a first pressure sensor measuring an internal pressure of the body; and a second pressure sensor installed in each of the filtering units, the second pressure sensor measuring an internal pressure of the filter of the corresponding filtering unit, wherein under control of the control unit, when there are filtering units the internal pressures of which differ from the internal pressure of the body by a predetermined level or more, the automatic washing units of the corresponding filtering units are sequentially operated so as to prevent back pressures of the filtering units from increasing during a backwashing process, thus making the backwashing process reliable.

In still another embodiment, the second pressure sensor may measure the internal pressure of the filter through a pressure measurement hole formed in the upper cover plate that closes a filter insert hole formed in an upper end of the body.

In still another embodiment, a first drain line may be provided under the body so that when operation of the filtering device is interrupted, ballast water that is in the body is drained out of the body through the first drain line so as to prevent an inner surface of the body from corroding with stagnant ballast water. A first air injection unit may be provided on an upper end of the body so as to inject air into the body so that when the ballast water that is in the body is drained through the first drain line, the first air injection unit injects air into the body, thus removing foreign substances from the inner surface of the body.

In still another embodiment, a second drain line may be formed under a lower portion of the backwash line formed by the discharge pipes so that when operation of the filtering device is interrupted, ballast water that is in the backwash line is drained through the second drain line so as to prevent an inner surface of the backwash line from corroding with stagnant ballast water. A second air injection unit may be provided on each of the discharge pipes so as to inject air into the discharge pipe so that when the ballast water that is in the backwash line is drained through the second drain line, the second air injection unit injects air into the discharge pipe, thus removing foreign substances from an inner surface of the discharge pipe.

In still another embodiment, an upper end of the filter may be coupled to a top surface of the body, and a lower end of the filter may be coupled to a partition of the body. A seat may be attached to each of the upper and lower ends of the filter, the seat being placed on the body while making direct contact with the body. An O-ring may be provided between contact surfaces of the seat and the body so that ballast water that has been filtered in the filter is prevented from leaking out of the filter due to filtration pressure through space between the contact surfaces of the filter and the body.

In still another embodiment, the seat provided on the upper end of the filter may come into contact with a downward protrusion of an upper cover plate that covers a filter insert hole formed in the top surface of the body, and the corresponding O-ring may be disposed in a first O-ring recess formed in the downward protrusion of the upper cover plate, so that the O-ring is allowed to be replaced with another by separating only the upper cover plate from the body, whereby replacement of the O-ring can be facilitated.

In still another embodiment, the seat provided on the lower end of the filter may come into contact with a protrusion enclosing a ballast water supply hole formed in the partition of the body, and the corresponding O-ring may be disposed in a second O-ring recess formed in the seat provided on the lower end of the filter, so that the O-ring is allowed to be replaced with another by separating only the filter from the body, whereby replacement of the O-ring can be facilitated.

Advantageous Effects

The following effects can be obtained from the above-described embodiments and the construction, element coupling relationship and operation of the present invention which will be described later herein.

In a multi-cage type ballast water filtering device according to the present invention, a back pressure prevention tank is installed on a backwash line through which backwash water used to backwash filters to remove foreign substances from the filters is discharged out of the filtering device. Thereby, backwash water and foreign substances that flow along the backwash line are primarily stored in the back pressure prevention tank, thus preventing back pressure in the backwash line from increasing.

The water level in the back pressure prevention tank can be always maintained lower than an inlet connected to the backwash line so that the back pressure in the backwash line can be prevented from increasing.

When the water level in the back pressure prevention tank that is measured by a water level sensor is a predetermined level or more, backwash water stored in the tank is forcibly drained by a pump. Thereby, the water level in the tank can be always maintained in a predetermined level or less.

Given special installation conditions of the filtering device used in a ship, among the elements the installation positions of which have been focused on the upper part of the filter device in the conventional technique, a discharge unit and a backwash line for discharging foreign substances out of the filtering device after backwashing the filters are relocated to a lower part of the filtering device. Furthermore, discharge pipes of filtering units communicate with each other to form a single line, whereby the structure of the filtering device can be simplified, space required to install the elements above the upper part of the filtering device can be reduced, and discharge of foreign substances and back pressure of the filtering units can be integrally and effectively controlled.

The filtering device according to the present invention includes double or triple structures for fundamentally preventing elements of automatic washing units that move upwards and downwards to backwash filters of the filtering units from colliding with each other and being damaged, thus preventing the filtering device from being damaged, and enhancing the durability of the filtering device.

Furthermore, in the present invention, when backwashing the filter of each filtering unit, a moving path of a suction unit of the filtering unit that sucks foreign substances from the filter can cover all areas of the inner surface of the filter such that some foreign substances are prevented from remaining on the filter around the moving path. When the filtering device is not in operation, all ballast water can be completely discharged out of the filtering device. Moreover, the filtering device is configured such that a seal of the filter can be reliably created, and a desired element can be easily replaced with another.

DESCRIPTION OF THE REFERENCE NUMERALS IN THE DRAWINGS

Figure 1:
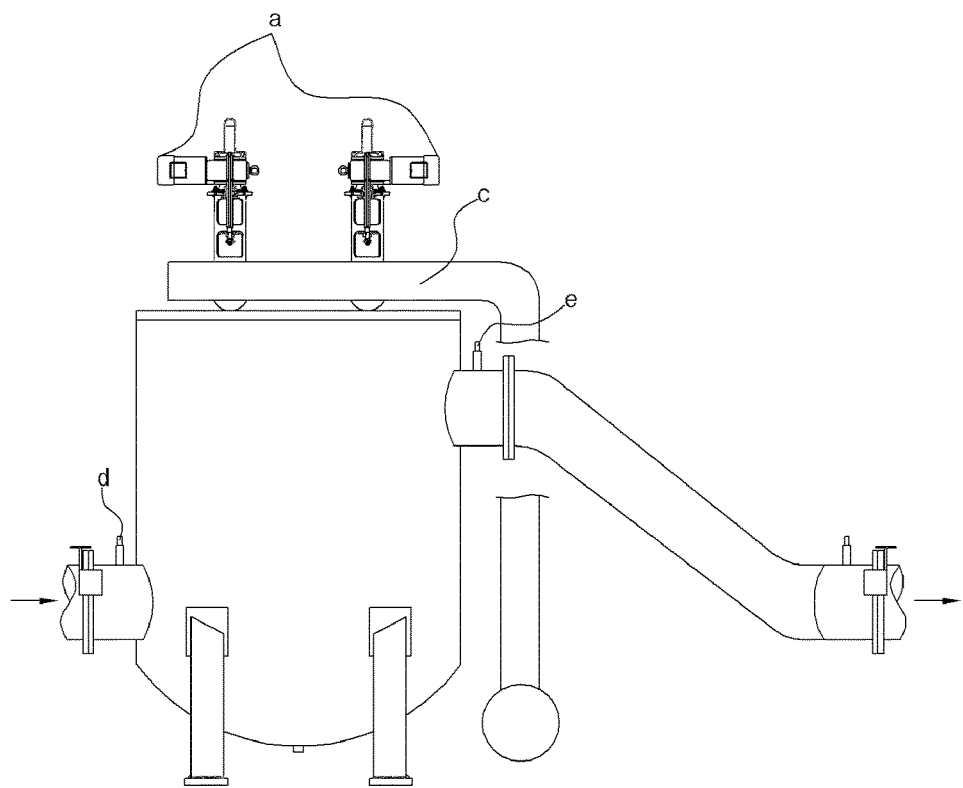
FIG. 1 is a side view showing a conventional multi-cage type ballast water filtering device.

10: body
110: inlet port 120: outlet port 130: top surface
131: filter insert hole 140: partition
141: ballast water supply hole 142: protrusion 143: bushing
 150: bottom surface 151: support
161: pre-filtering chamber 162: post-filtering chamber 170: upper cover plate
171: downward protrusion 172: O-ring recess
173: pressure measurement hole 180: drain line
181: control valve 190: air injection unit 20: filter
210: seat 211: second O-ring recess
30: automatic washing unit
310: drive unit 311: drive motor 312: drive shaft
313: contact means 314: first limit switch
315: second limit switch
320: suction unit 321: suction rod 3211: suction hole
322: core 3221: stopper
330: discharge unit 331: discharge pipe 3311: exhaust valve
332: backwash line 3321: second drain line
33211: second control valve
3322: second air injection unit
333: back pressure prevention tank 3331: inlet 3332: outlet
3333: water level sensor 3334: pump
40: first pressure sensor 50: second pressure sensor
60: O-ring

REFERENCE NUMERALS RELATED TO THE CONVENTIONAL TECHNIQUE a: drive unit b: discharge unit c: discharge pipe
d: inlet port pressure sensor e: outlet port pressure sensor f: rubber packing

BEST MODE

Hereinafter, preferred embodiments of a multi-cage type ballast water filtering device having a backpressure prevention function according to the present invention will be described in detail with reference to the attached drawings. If in the specification, detailed descriptions of well-known functions or configurations would unnecessarily obfuscate the gist of the present invention, the detailed descriptions will be omitted.

Figure 3:
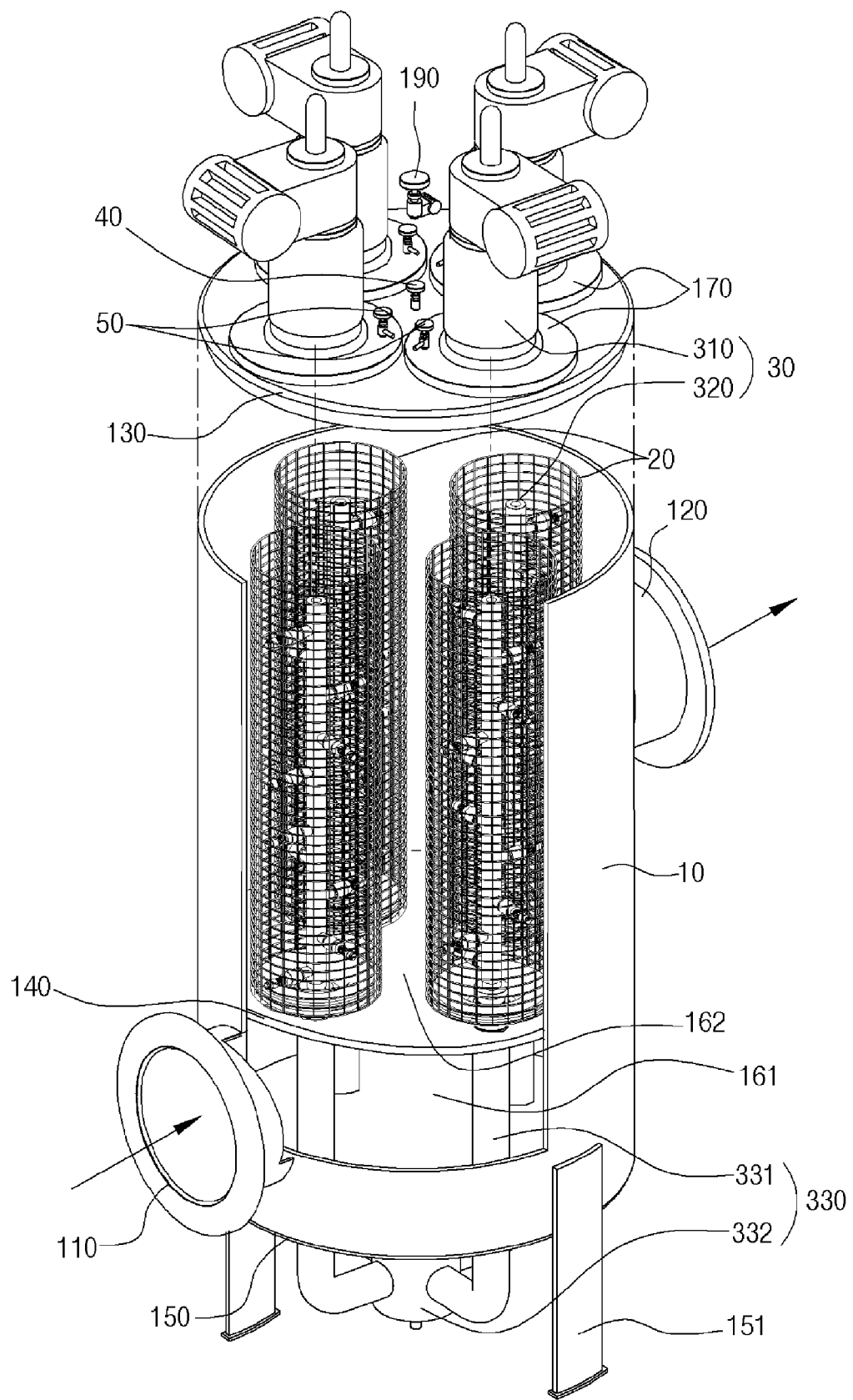
FIG. 3 is an exploded perspective view of a multi-cage type device for filtering ballast water, according to an embodiment of the present invention.
Figure 4:
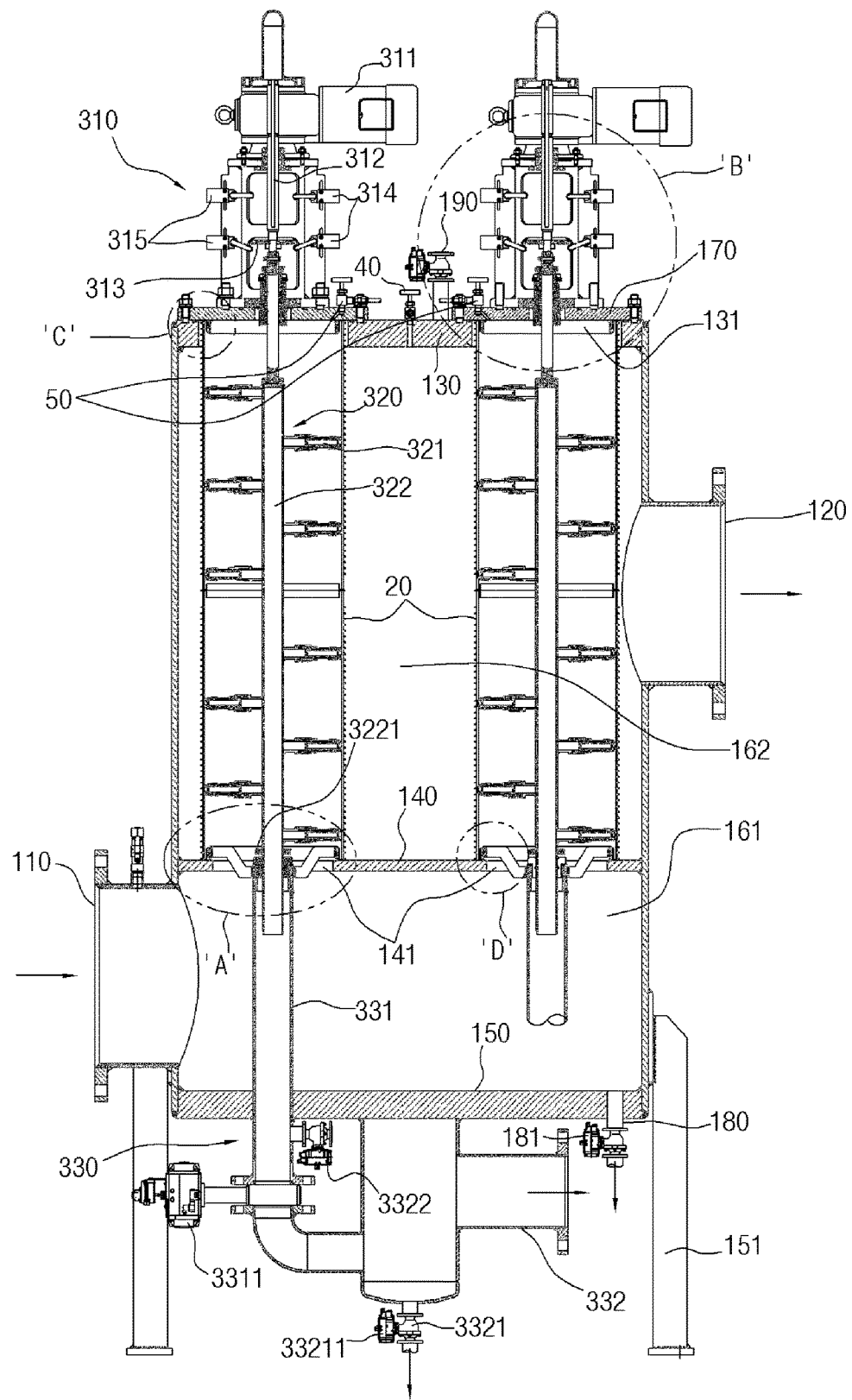
FIG. 4 is a sectional view of the filtering device of FIG. 3.
Figure 5:
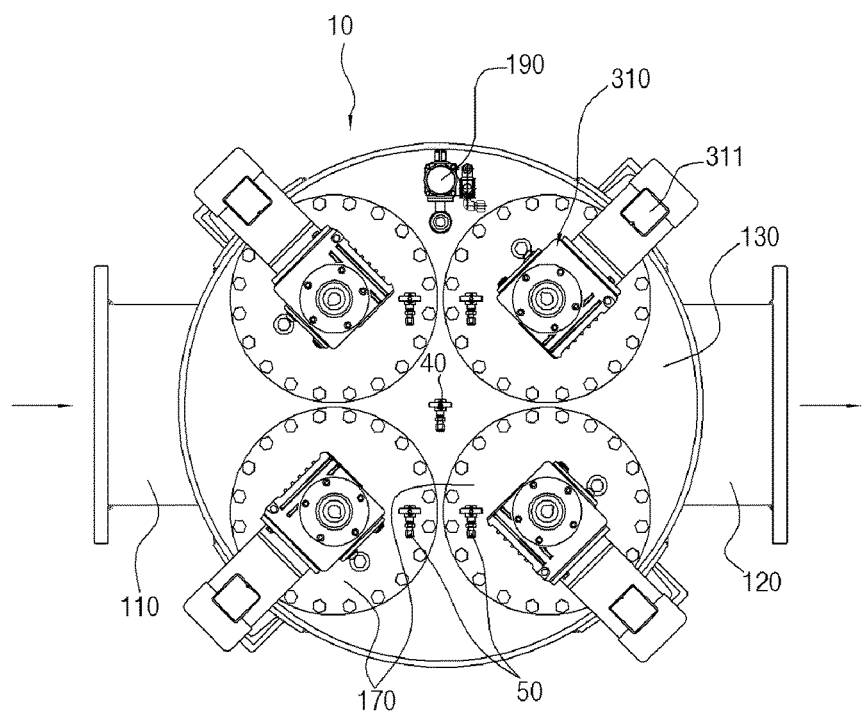
FIG. 5 is a plan view of the filtering device of FIG. 3.
Figure 6:
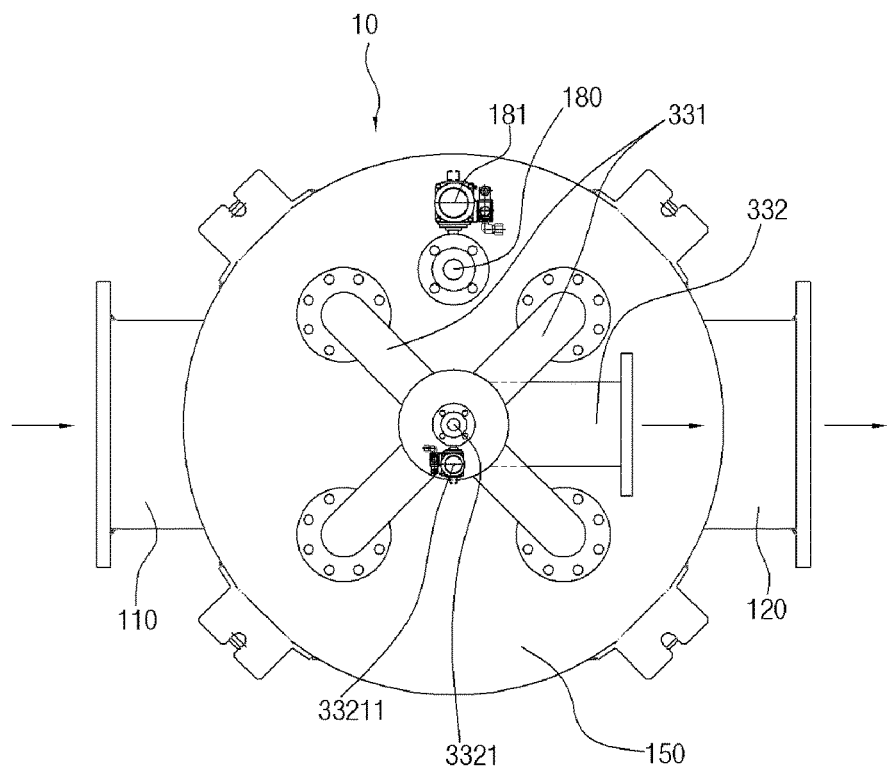
FIG. 6 is a bottom view of the filtering device of FIG. 3.
Figure 7:
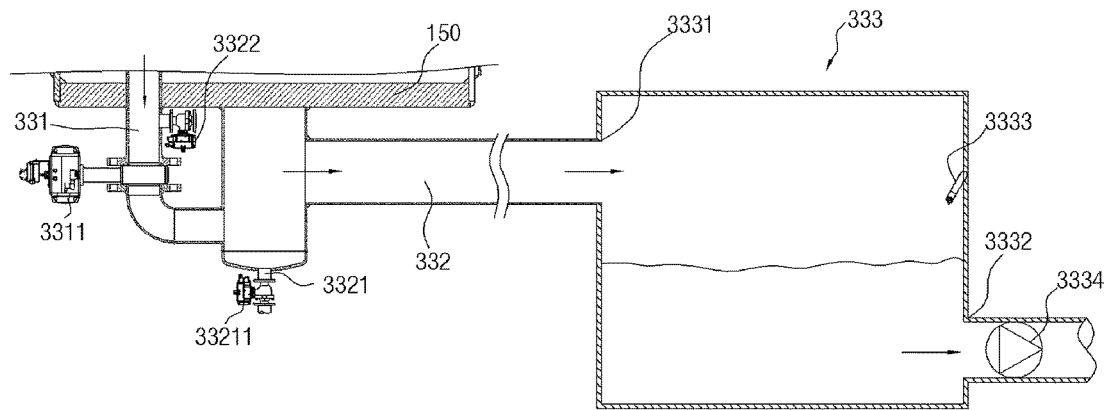
FIG. 7 is a sectional view showing the relationship between a backwash line and a back pressure prevention tank.
Figure 8:
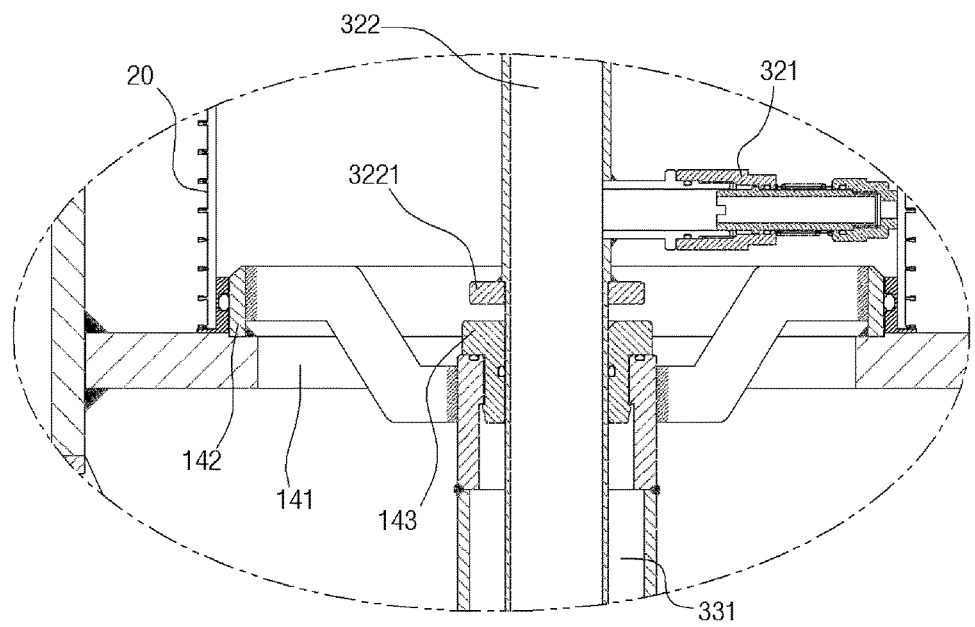
FIG. 8 is an enlarged view of portion 'A' of FIG. 4 to illustrate the relationship between a stopper and a bushing.
Figure 9:
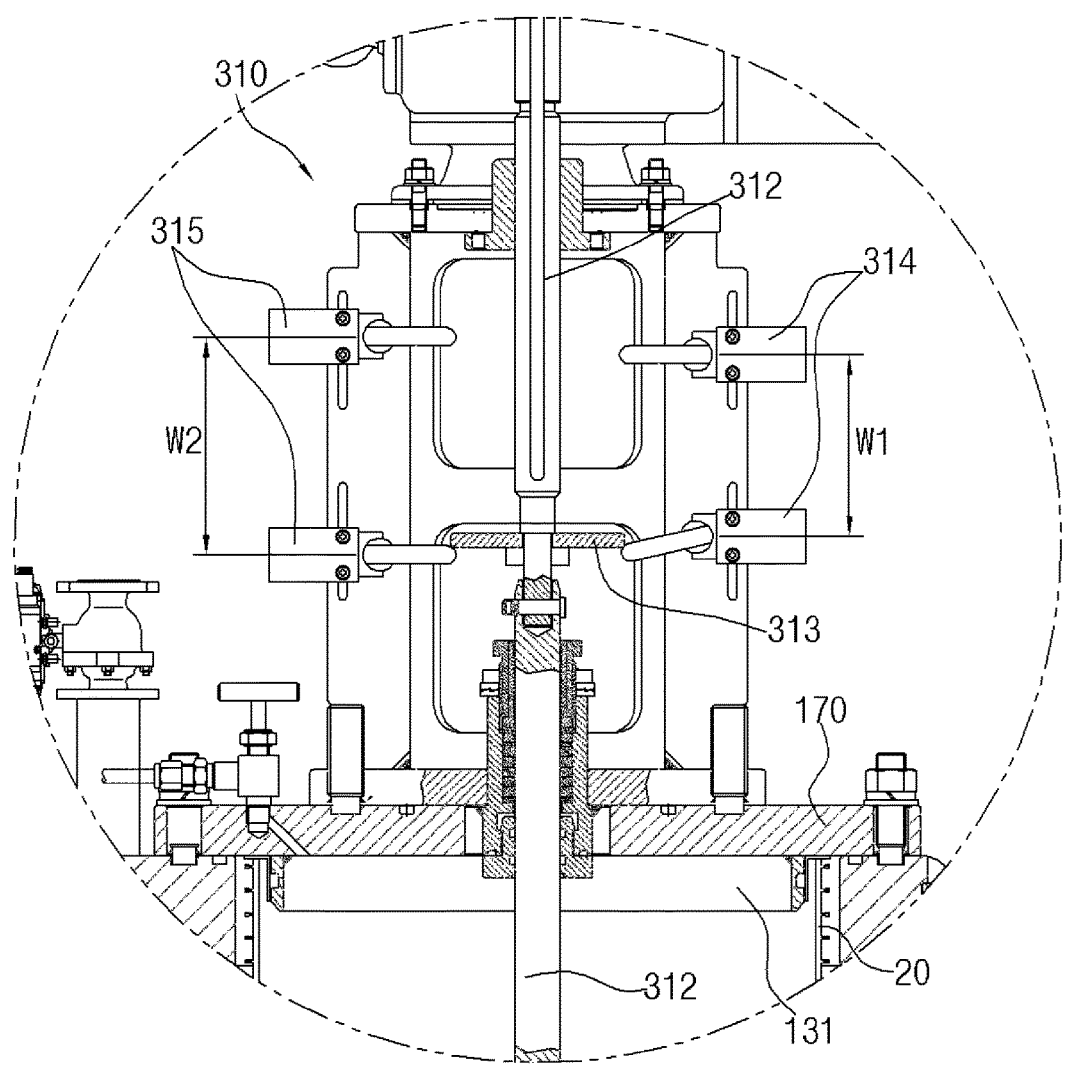
FIG. 9 is an enlarged view of portion 'B' of FIG. 4 to illustrate the detailed construction of a drive unit.
Figure 10:
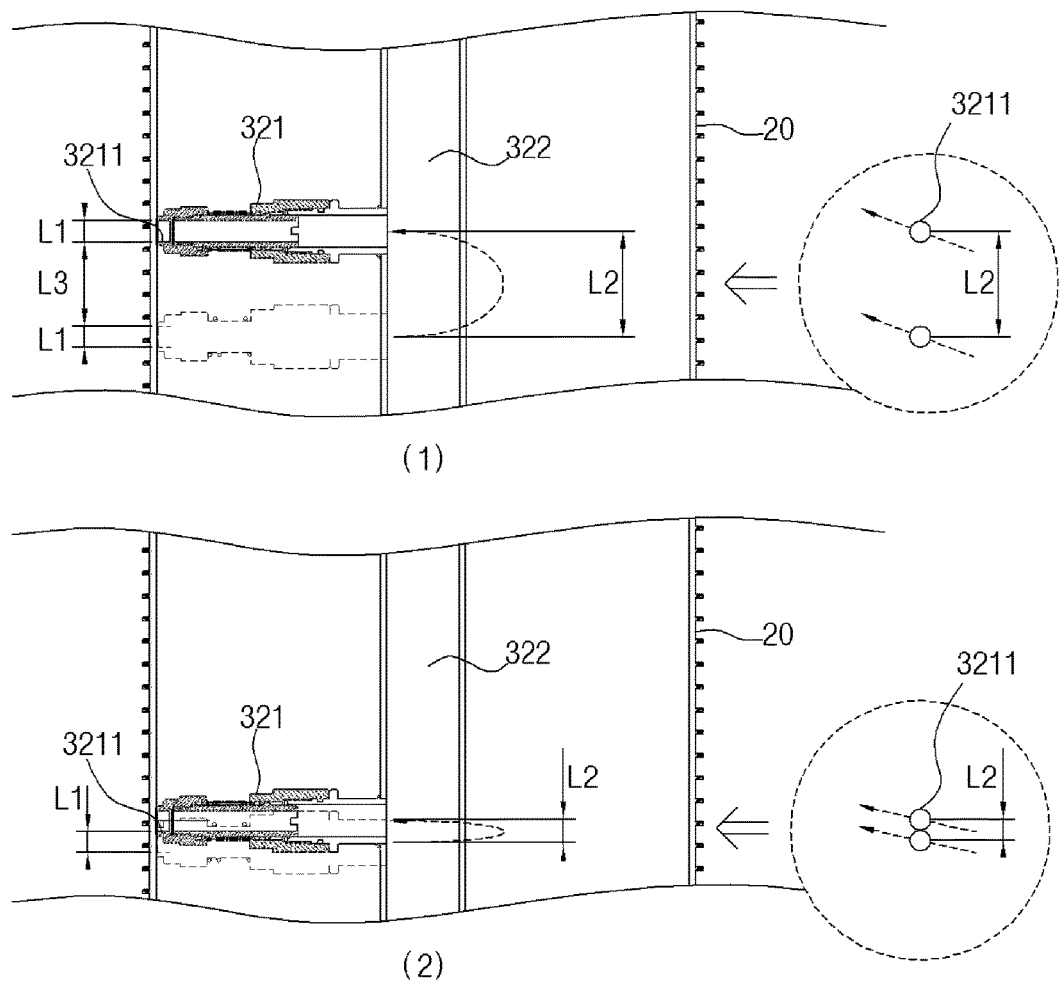
FIG. 10 is a reference view showing the relationship between a lead to which a suction rod moves when making a turn and a diameter of an inlet hole.
Figure 11:
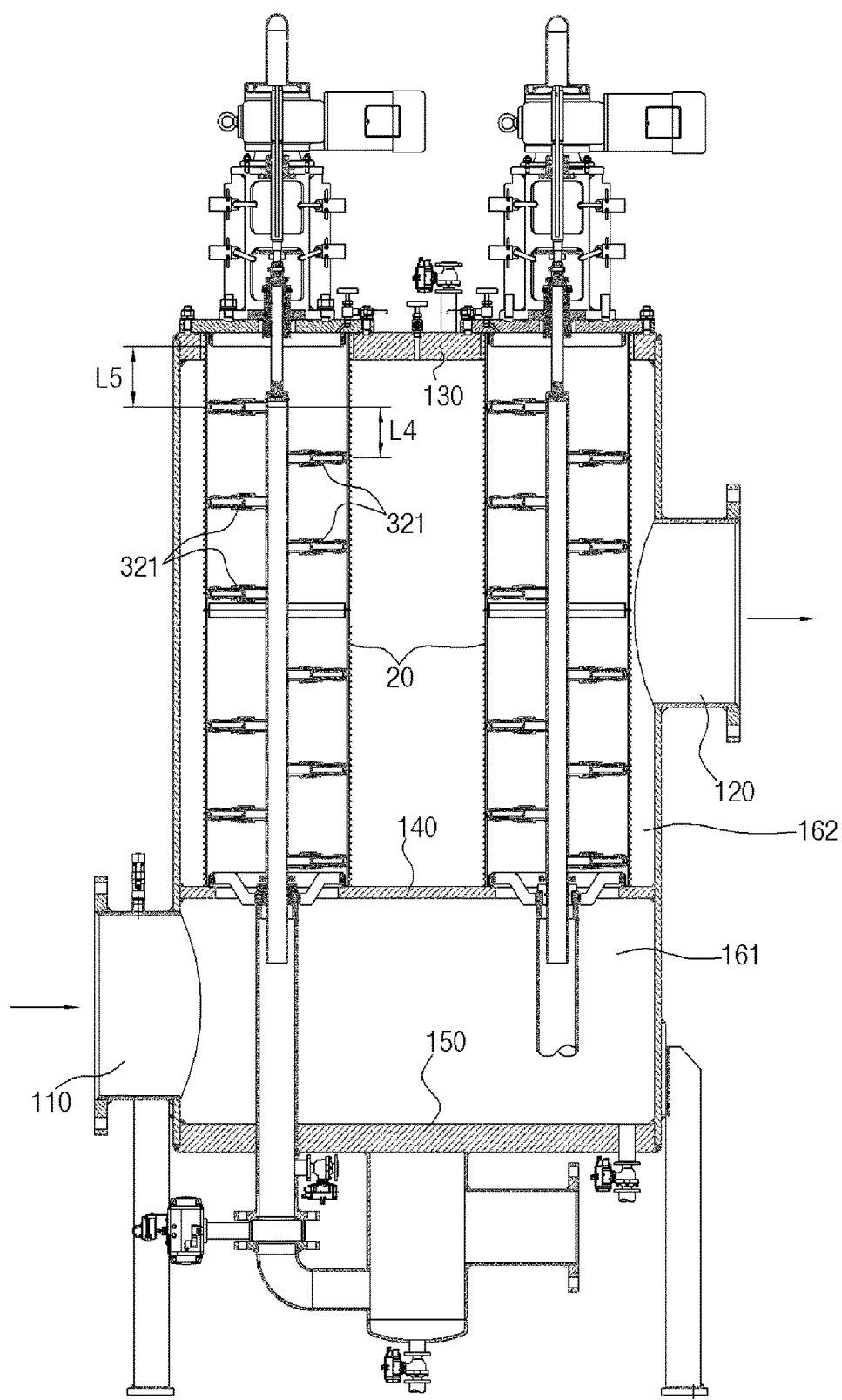
FIG. 11 is a reference view showing a vertical movement distance of each suction rod and spacing between suction rods.
Figure 12:
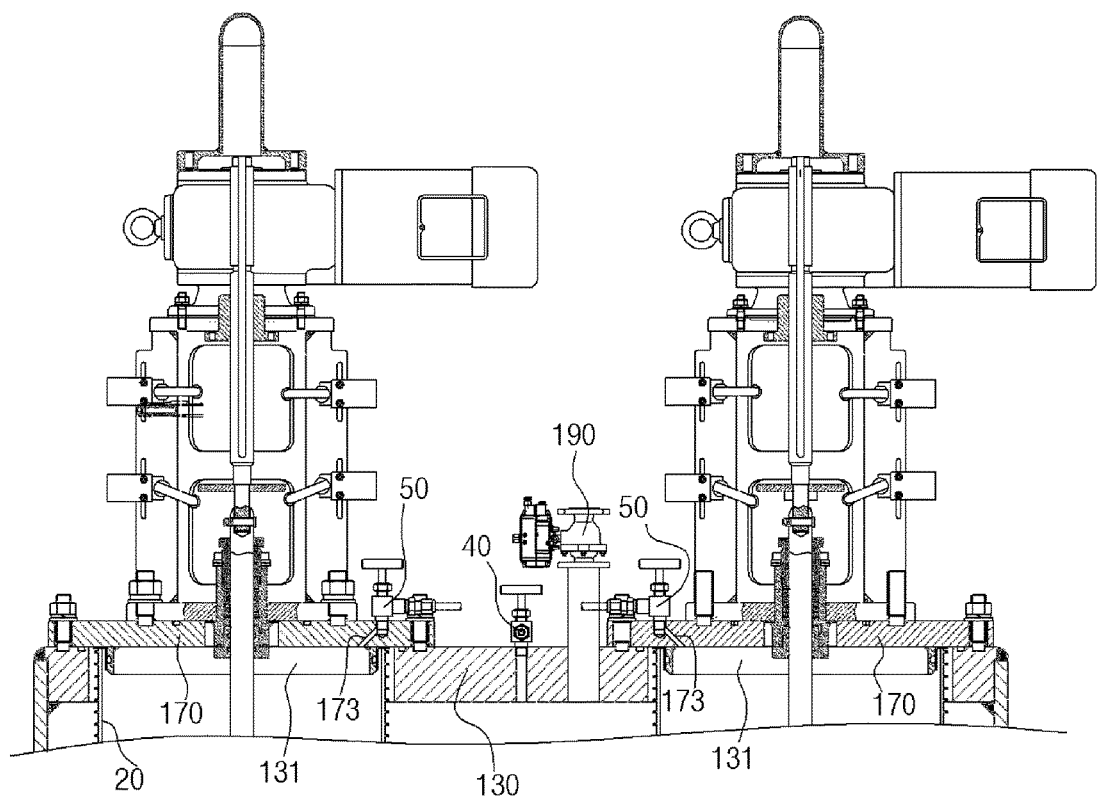
FIG. 12 is a sectional view showing the installation positions of first and second pressure sensors.
Figure 13:
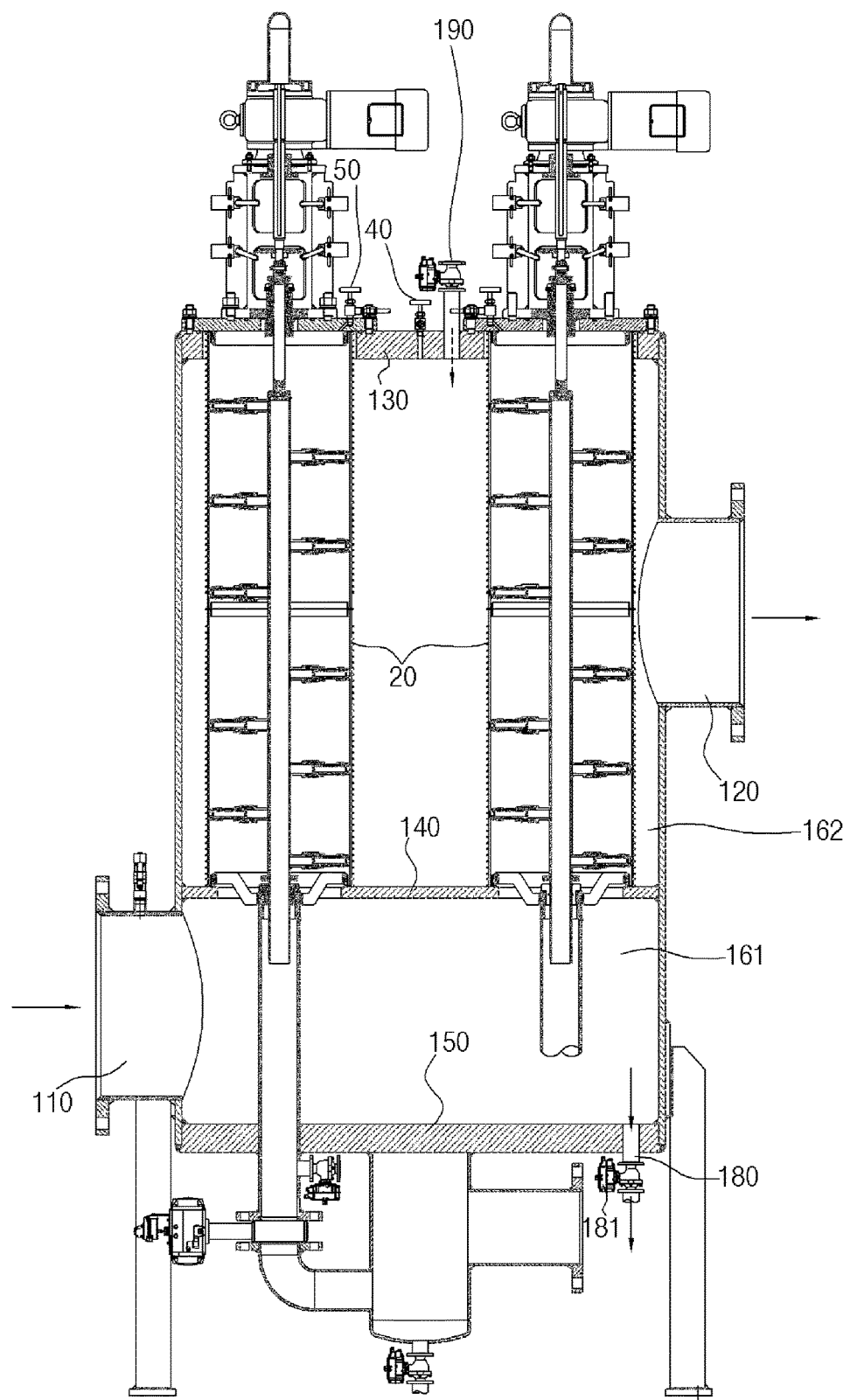
FIG. 13 is a sectional view showing the installation positions of a drain line and an air injection unit.
Figure 14:
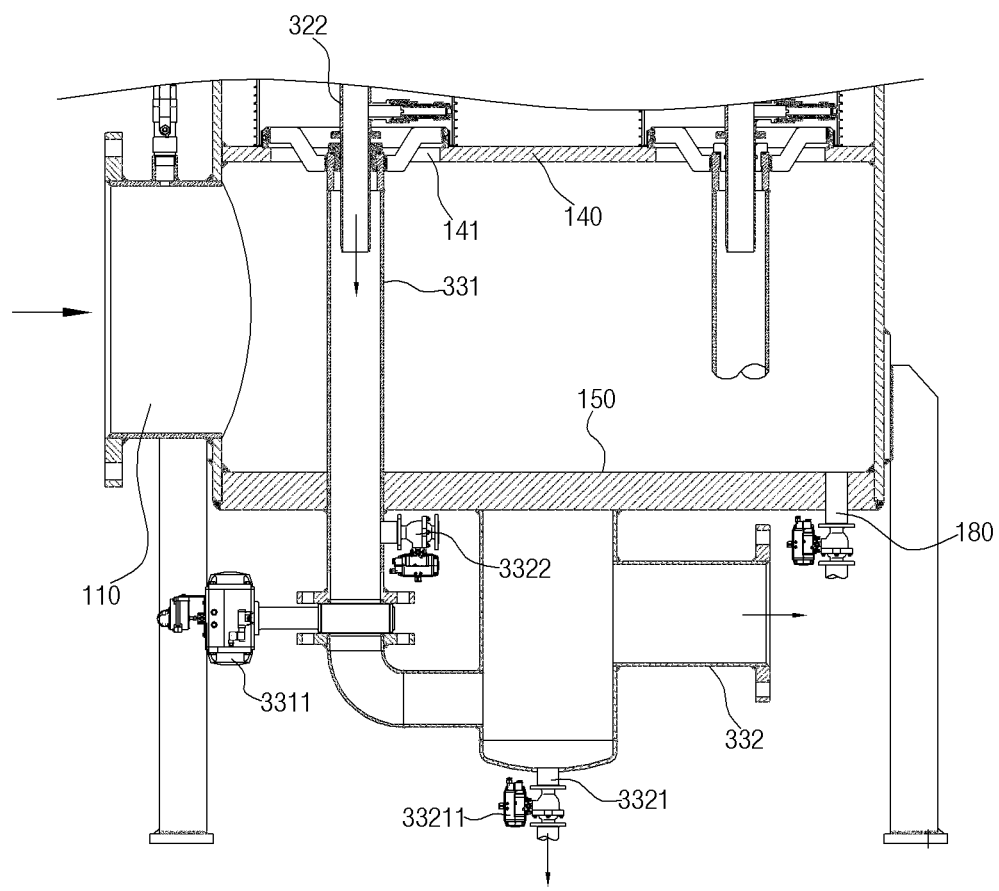
FIG. 14 is a sectional view showing the installation positions of a second drain line and a second air injection unit.
Figure 15:
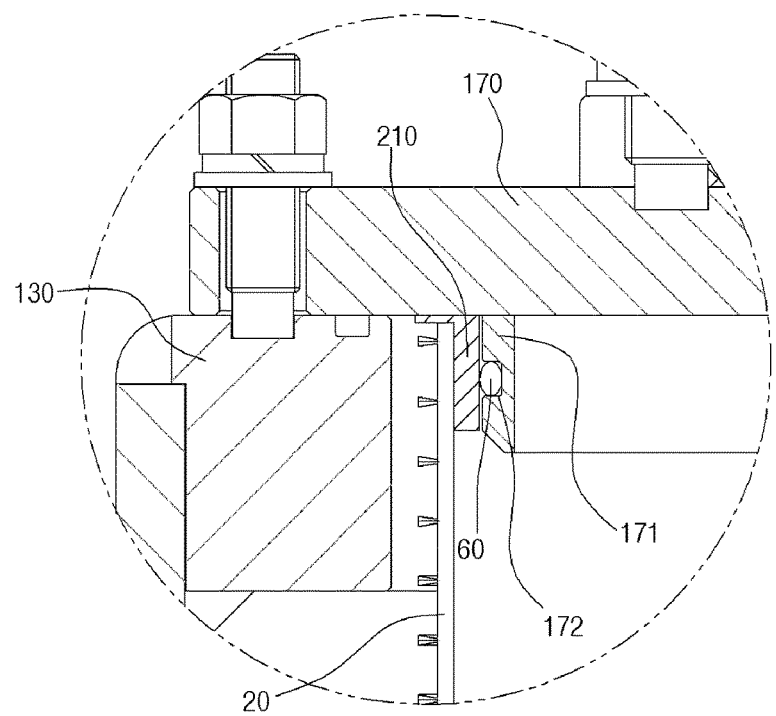
FIG. 15 is an enlarged view of portion 'C' of FIG. 4 showing the coupling structure of an upper end of a filter.
Figure 16:
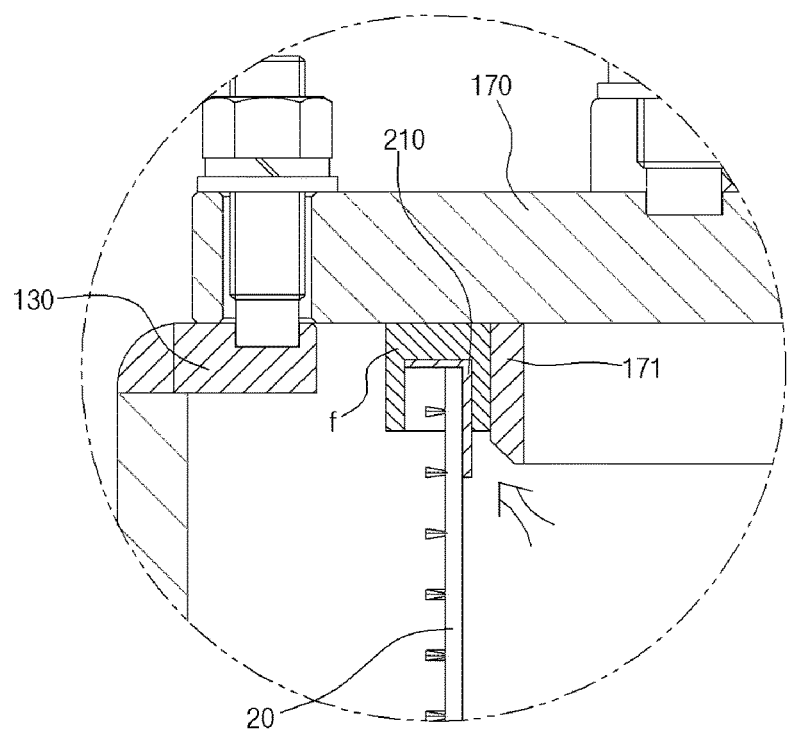
FIG. 16 is a sectional view showing the coupling structure of an upper end of a filter according to a conventional technique.
Figure 17:
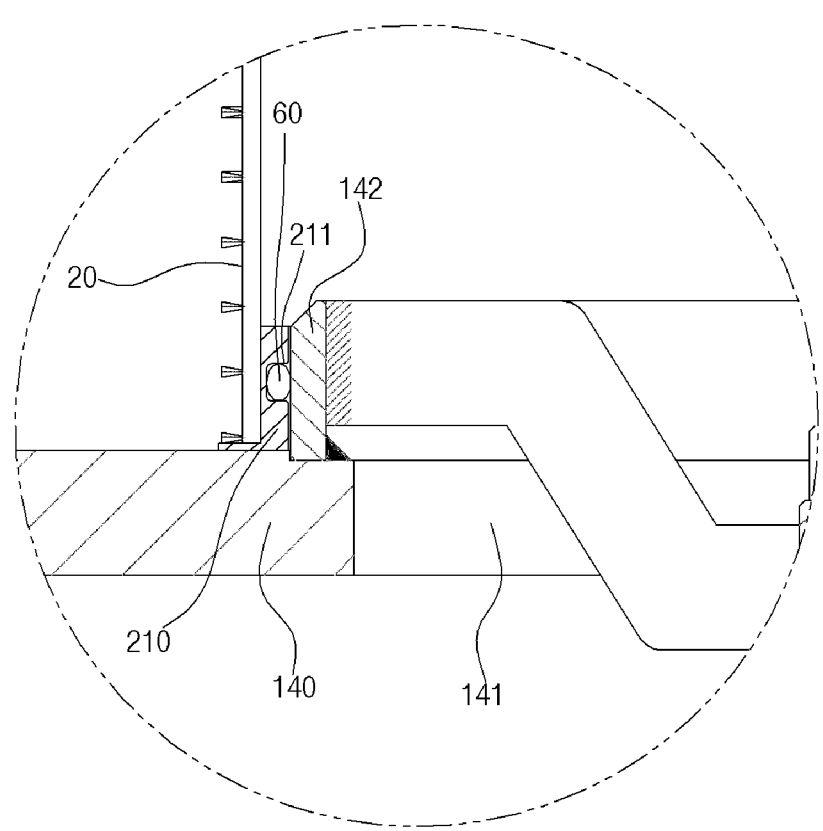
FIG. 17 is an enlarged view of portion 'D' of FIG. 4 showing the coupling structure of a lower end of a filter.

FIG. 3 is an exploded perspective view of a multi-cage type device for filtering ballast water, according to an embodiment of the present invention. FIG. 4 is a sectional view of the filtering device of FIG. 3. FIG. 5 is a plan view of the filtering device of FIG. 3. FIG. 6 is a bottom view of the filtering device of FIG. 3. FIG. 7 is a sectional view showing the relationship between a backwash line and a back pressure prevention tank. FIG. 8 is an enlarged view of portion 'A' of FIG. 4 to illustrate the relationship between a stopper and a bushing. FIG. 9 is an enlarged view of portion 'B' of FIG. 4 to illustrate the detailed construction of a drive unit. FIG. 10 is a reference view showing the relationship between a lead to which a suction rod moves when making a turn and a diameter of an inlet hole. FIG. 11 is a reference view showing a vertical movement distance of each suction rod and spacing between suction rods. FIG. 12 is a sectional view showing the installation positions of first and second pressure sensors. FIG. 13 is a sectional view showing the installation positions of a drain line and an air injection unit. FIG. 14 is a sectional view showing the installation positions of a second drain line and a second air injection unit. FIG. 15 is an enlarged view of portion 'C' of FIG. 4 showing the coupling structure of an upper end of a filter. FIG. 16 is a sectional view showing the coupling structure of an upper end of a filter according to a conventional technique. FIG. 17 is an enlarged view of portion 'D' of FIG. 4 showing the coupling structure of a lower end of a filter.

The basic construction of a multi-cage type ballast water filtering device according to an embodiment of the present invention will be explained with reference to FIGS. 3 through 6. The multi-cage type ballast water filtering device according to the embodiment of the present invention includes a body 10 which has an inlet port 110 and an outlet port 120 through which ballast water is drawn into and discharged from the body 10, and a plurality of filtering units which are connected to each other to form a packaged structure in the body 10. Each filtering unit includes a filter 20 which filters ballast water that flows through the body 10, and an automatic washing unit 30 which backwashes the filter 20 to remove foreign substances that have adhered to the filter 20 (that is, although no reference numeral is given to the filtering unit, it refers to a unit including the filter 20 and the automatic washing unit 30).

The body 10 forms an outer frame of the multi-cage type ballast water filtering device according to the present invention. Drawn into the body 10 through the inlet port 110, ballast water passes through the filtering units disposed in the body 10 so that foreign substances is removed from the ballast water. Thereafter, the filtered ballast water is discharged out of the body 10 through the outlet port 120. Preferably, the outlet port 120 of the body 10 is disposed higher than the inlet port 110. As shown in FIG. 4, the body 10 has a pre-filtering chamber 161 and a post-filtering chamber 162 therein. The pre-filtering chamber 161 is formed by a bottom surface 150 that forms the lowermost surface of the body 10 and a partition 140 that forms an intermediate surface of the body 10, with the inlet port 110 disposed between the bottom surface 150 and the partition 140. Ballast water drawn through the inlet port 110 is temporarily stored in the pre-filtering chamber 161 before filtering. The post-filtering chamber 162 is formed by the partition 140 and a top surface 130 which forms the uppermost surface of the body 10, with the outlet port 120 disposed between the partition 140 and the top surface 130. The filters 20 are disposed in the post-filtering chamber 162, and ballast water that has been filtered by the filters 20 is stored in the post-filtering chamber 162. The top surface 130 has filter insert holes 131 through which the filters 20 can be inserted into the body 10. After the filters 20 have been installed, upper cover plates 170 are coupled to the top surface 130 to cover the respective filter insert holes 131. Ballast water supply holes 141 are formed in the partition 140 so that ballast water that has been in the pre-filtering chamber 161 can be supplied to the filters 20. Enclosing each ballast water supply hole 141, a protrusion 142 is provided on the partition 140 and is brought into contact with an inner surface of a lower end of the corresponding filter 20 so that the lower end of the filter 20 can be stably fixed.

Each filter 20 is configured to filter ballast water drawn into the body 10 and remove foreign substances or the like from the ballast water. The filter 20 is inserted into the body 10 through the corresponding filter insert hole 131 and disposed in the post-filtering chamber 162. The lower end of the filter 20 is fastened to the partition 140, and an upper end thereof is fastened to the top surface 130. Ballast water, which has been drawn in the pre-filtering chamber 161 through the inlet port 110 and temporarily stored in the pre-filtering chamber 161, is supplied into each filter 20 through the corresponding ballast water supply hole 141 and then flows into the post-filtering chamber 162 while foreign substances or the like are caught by an inner circumferential surface of the filter 20 and thus filtered out from the ballast water. Preferably, each filter 20 has a cylindrical shape. While ballast water passes through the filter 20, foreign substances, for example, creatures, particles, etc., are filtered out from the ballast water. As such filtering operation continues, foreign substances are deposited on the inner circumferential surface of the filter 20, thus deteriorating the filtering function. Given this, the automatic washing unit 30 which will be explained in detail later herein conducts the operation of removing foreign substances from the inner circumferential surface of the filter 20.

The automatic washing unit 30 functions to backwash the filter 20 to remove foreign substances that have adhered to the filter 20. To achieve this purpose, the automatic washing unit 30 includes a drive unit 310 which operates the automatic washing unit in response to a signal of a control unit (not shown), a suction unit 320 which is connected to and moved by the drive unit 310 and sucks foreign substances from the filter 20, and a discharge unit 330 which discharges the foreign substances, sucked by the suction unit 320, out of the device.

The drive unit 310 provides power to operate the automatic washing unit 30 and uses the power to rotate the suction unit 320 and/or move it in the vertical direction. The drive unit 310 includes a drive motor 311 which provides drive force, and a drive shaft 312 which is connected at a first end thereof to the drive motor 311 and is rotated and/or vertically moved by drive force transmitted from the drive motor 311 so that a core 322 of the suction unit 320, which is connected to a second end of the drive shaft 312 and will be explained in detail later herein, is rotated and/or moved in the vertical direction by the operation of the drive shaft 312. To specify a vertical movement distance range of the drive shaft 312, a separate contact means (313, an example of this is a disc which is configured to come into contact with a pair of limit switches which will be described later herein) is attached to the drive shaft 312, and a pair of first limit switches 314 are provided at positions spaced apart from each other by a predetermined distance (corresponding to the vertical movement distance of the drive shaft 312) with the contact means 313 disposed therebetween. While the drive shaft 312 moves in the vertical direction, if the contact means 313 comes into contact with the lower first limit switch 314, the drive shaft 312 is moved upwards and, in contrast, if the contact means 313 comes into contact with the upper first limit switch 314, the drive shaft 312 is moved downwards.

Connected to the drive unit 310, the suction unit 320 moves and sucks foreign substances adhering to the filter 20. The suction unit 320 includes a plurality of suction rods 321 which suck foreign substances adhering to the filter 20, and the core 322 to which the suction rods 321 are connected at positions spaced apart from each other at regular intervals in the longitudinal direction of the core 322. The core 322 is coupled at an end thereof to the drive shaft 312 of the drive unit 310 and is rotated and/or vertically moved in conjunction with the rotation and/or vertical movement of the drive shaft 312, thus acting as a rotating shaft to rotate the suction rods 321. An end of each suction rod 321 comes into contact with the inner circumferential surface of the filter 20 or is positioned close to it. A suction hole 3211 is formed in the suction rod 321 along the longitudinal axis thereof, so that the suction rod 321 sucks, through the suction hole 3211, foreign substances adhering to the inner circumferential surface of the filter 20 and backwash water (that is, filtered ballast water that is outside the filter 20 is drawn backwards into the filter 20 again by suction pressure in the suction hole 3211 and is sucked, along with foreign substances adhering to the inner surface of the filter 20, into the suction hole 3211, wherein this ballast water is referred to as 'backwash water'). The foreign substances and backwash water that are sucked into the suction rod 321 are moved into the core 322. Foreign substances and backwash water that are drawn from the suction rods 321 into the core 322 are moved to the discharge unit 330 through a pipe passage which is longitudinally formed in the core 322, and then discharged out of the device.

The discharge unit 330 functions to discharge foreign substances, etc., sucked by the suction unit 320, out of the device. The discharge unit 330 includes a discharge pipe 331 which is a discharge passage for foreign substances. A first end of the discharge pipe 331 communicates with the core 322, and a second end thereof communicates with the outside so that foreign substances, etc. can be discharged from the core 322 to the outside. An exhaust valve 3311 is connected to a predetermined portion of the discharge pipe 331. The exhaust valve 3311 is used to control supply of suction force for sucking/discharging foreign substances adhering to the inner surface of the filter 20. The exhaust valve 3311 is controlled by the control unit (not shown). That is, when the exhaust valve 3311 opens, pressure inside the discharge pipe 331, the core 322 and the suction rod 321 becomes lower than atmospheric pressure, in other words, pressure in the post-filtering chamber 162 or the filter 20. Thus, ballast water that has been in the post-filtering chamber 162 is sucked into the suction rod 321 that is under low pressure, whereby foreign substances, etc. that have adhered to the inner surface of the filter 20 are sucked along with the ballast water into the suction rod 321 (here, the ballast water of the post-filtering chamber 162 that is sucked into the suction rod 321 functions as backwash water). When the exhaust valve 3311 is closed, the suction of backwash water, foreign substances, etc. is interrupted.

In the multi-cage type ballast water filtering device according to the embodiment of the present invention, particularly, in the discharge unit 330, the discharge pipe 331 which functions as a passage for discharging foreign substances is disposed under the body 10. In more detail, the discharge pipe 331 of the filtering units communicates with a single backwash line 332 below the body 10, thus increasing space efficiency in a ship, and simplifying the structure of the device.

Figure 2:
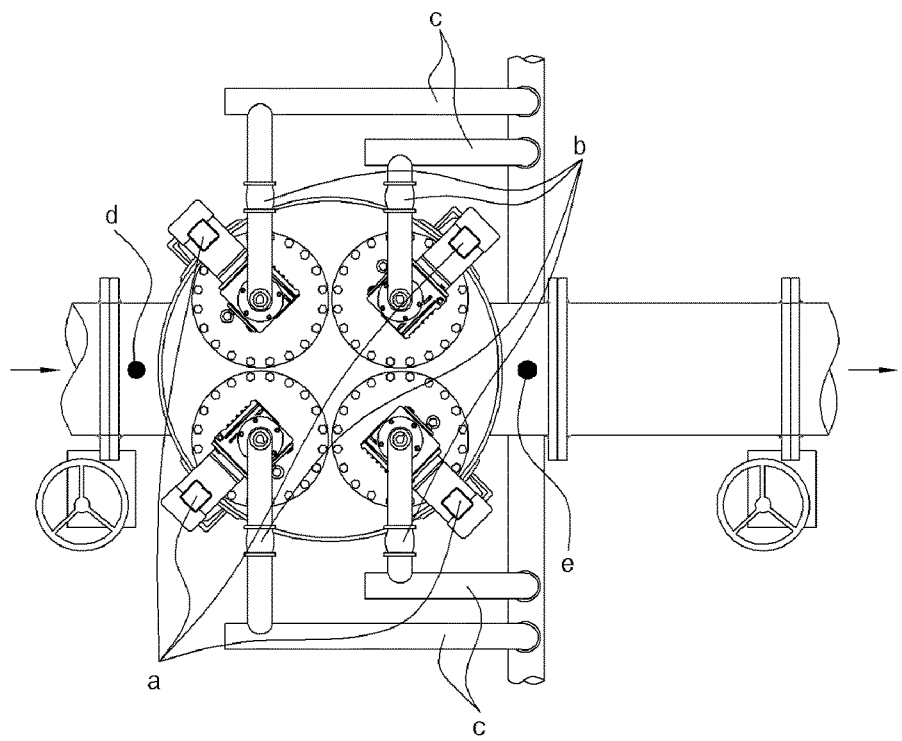
FIG. 2 is a plan view showing the conventional multi-cage type ballast water filtering device.

As described above as the problems of the conventional technique, in the conventional multi-cage type ballast water filtering device, not only the drive unit a which operates the backwash device to backwash the filtering units of the filtering device but the discharge unit b and the discharge pipe c for discharging foreign substances to the outside after backwashing are also disposed on an upper part of the filtering device (refer to FIGS. 1 and 2). Because these elements are disposed together on the upper part of the filtering device, replacement work or disassembly work as well as installation work on the body of the filtering device becomes complicated. Particularly, under special environment conditions, that is, in a ship, space provided to install the filtering device or the like is very small (generally, to ensure sufficient space for original purposes of the ship, it is designed such that space such as a machinery room is relatively small). Therefore, given the fact that space defined above the upper part of the filtering device is also small, the conventional structure in which installation positions of many kinds of elements are focused on the upper part of the filtering device makes the maintenance of the filtering device more difficult. In addition, the more the number of elements installed on the upper part of the filter device, the more space above the upper part of the filtering device to install the elements or allow disassembly work is required. Thus, an inefficient spatial structure is caused in that under special environment conditions, that is, in a ship, a separate upper space for the filtering device must be secured but a lower space, which is formed between the filtering device and the bottom of the machinery room by a support for supporting the filtering device thereon, is not used.

Therefore, in the present invention, in order to fundamentally solve the conventional problems, as shown in FIGS. 3 through 6, the discharge pipes 331 of the discharge unit 330 that are the passages for discharging foreign substances to the outside are disposed in the lower part of the body 10 rather than being in the upper part of the body 10. The discharge pipes 331 pass through the bottom surface 150 of the body 10 and protrude outwards from the bottom surface 150. Protruding from the lower end of the body 10, the discharge pipes 331 of the filtering units communicate with each other, thus forming the single backwash line 332. Thereby, foreign substances, etc. that are transferred from the filtering units during the backwashing process can be discharged to the outside through the single backwash line 332 at one time. In this structure of the present invention, the drive unit 310 and the discharge unit 330 are separately disposed in such a way that the drive unit 310 is provided on the upper part of the body 10, and the discharge unit 330 is disposed in the lower part of the body 10. Hence, the present invention can solve the problems of the conventional technique in which the installation positions of many elements are focused on the upper part of the body 10. In addition, in the ship, that is, under special environmental conditions, the upper space of the filtering device is not required to be excessively large. The lower space which is formed between the filtering device and the bottom of the machinery room by a support 151 for supporting the filtering device thereon, can be used in such a way that the discharge unit 330 is disposed in the lower space. As a result, the efficiency in the use of space is increased. In addition, unlike the conventional technique, a separate discharge pipe that extends downwards from the discharge unit disposed on the upper part of the filtering device is not required, so that the filtering device can be manufactured to be more compact. Particularly, when it is required to install, replace or disassemble the discharge unit 330, it is possible for a worker to conduct the required work under the filter device without a need for entering a small space above the filtering device. Therefore, work convenience and maintenance convenience can be enhanced. Further, work for installing, replacing or disassembling the drive units 310 or other elements of the filtering devices on the upper part of the body 10 can also be easily conducted, because the discharge unit 330 is disposed under the lower part of the filtering device, in other words, is separated from the elements provided on the upper part of the filtering device. In addition, since the discharge pipe 331 extends downwards rather than upwards, foreign substances, etc. that are drawn into the discharge pipe 331 during the backwashing operation can be easily moved along the discharge pipe 331 (the reason for this is because the movement direction corresponds to the direction of gravity), and formation of back pressure in the discharge pipe 331 can also be prevented or reduced {Here, the term 'back pressure' is defined as follows: to suck foreign substances adhering to the inner surface of the filter 20 through the discharge pipe 331 and discharge them to the outside, although pressure formed in the discharge pipe 331 must be less than pressure formed outside the filter 20 (that is, pressure in the post-filtering chamber 162) or pressure formed in the filter 20, if the amount of foreign substances or backwash water that moves through the discharge pipe 331 is excessively increased so that the discharge pipe 331 is fully filled with foreign substances or backwash water, the pressure in the discharge pipe 331 is increased to make it difficult to suck foreign substances, etc. adhering to the inner surface of the filter 20; and this pressure in the discharge pipe is referred to as 'back pressure'. The higher the back pressure, the more difficult discharge of foreign substances through the discharge pipe 331 becomes. Therefore, it is important to control the pressure in the discharge pipe 331 such that the back pressure is prevented from increasing}. Furthermore, the discharge pipes 331 of the filtering units directly communicate with each other below the body 10, thus forming the single backwash line 332. Foreign substances or backwash water is discharged to the outside through the single backwash line 332. Thus, even if a large number of filtering units are present, the structure of the discharge unit 330 can be simple.

Moreover, in the present invention, to more fundamentally solve the problem of back pressure being formed in the discharge pipe 331 and/or the backwash line 332, as shown in FIG. 7, a back pressure prevention tank 333 is provided on the backwash line 332 so that backwash water and foreign substances drawn into the backwash line 332 are primarily stored in the back pressure prevention tank 333, whereby back pressure in the backwash line 332 can be prevented from increasing.

The back pressure prevention tank 333 has the same structure as that of a storage tank which has internal space to store water or the like therein. The back pressure prevention tank 333 is disposed on a medial portion of the backwash line 332. Thus, backwash water and foreign substances that have moved along the backwash line 332 are drawn into the back pressure prevention tank 333 when reaching the middle of the backwash line 332, and are temporarily stored therein. In detail, in the conventional technique in which only the backwash line 332 extending a relatively long length is provided, backwash water and foreign substances that have moved along the backwash line 322 settle in the pipe of the backwash line 332 when the force with which backwash water and foreign substances flow along the backwash line 332 becomes insufficient, thus reducing the degree of opening of the pipe of the backwash line 332. Thereby, pressure in the backwash line 332, that is, back pressure, is increased. On the other hand, in the present invention, because the separate back pressure prevention tank 333 is provided in the middle of the backwash line 332, backwash water and foreign substances that have moved along the backwash line 332 are temporarily stored in the back pressure prevention tank 333 in the middle of the backwash line 332. Thus, unlike the conventional technique, backwash water and foreign substances can rapidly move to the back pressure prevention tank 333 through the backwash line 332 without settling in the middle of the backwash line 322. As a result, the backwash line 332 can be prevented from being clogged with foreign substances, whereby back pressure can also be prevented from increasing.

As shown in FIG. 7, the back pressure prevention tank 333 is configured such that an outlet 3332 through which backwash water is discharged from the tank is disposed lower than an inlet 3331 through which backwash water is drawn into the tank. Thus, the level of water in the back pressure prevention tank 333 is maintained lower than the inlet 3331 so that backwash water, etc. that is drawn from the backwash line 332 into the back pressure prevention tank 333 through the inlet 3331 can smoothly flow without being stopped. Consequently, back pressure can be fundamentally prevented from increasing.

Furthermore, the back pressure prevention tank 333 includes a water level sensor 3333 which measures the level of water in the tank, and a pump 3334 which is operated to forcibly increase a discharge rate of backwash water, etc. when a water level measured by the water level sensor 3333 is a predetermined level or more. Thus, the water level in the tank can be always maintained constant, whereby back pressure in the backwash line 332 can be prevented from increasing. That is, in the present invention, the separate water level sensor 3333 for measuring the level of water in the tank is provided in the back pressure prevention tank 333. When the level of water in the tank is increased to a predetermined level (typically, a height corresponding to the position of the inlet 3331), the water level sensor senses this and operates the pump 3334 provided on a line which is connected to the outlet 3332, so that backwash water, etc. that has been stored in the tank can be forcibly more rapidly discharged to the outside through the outlet 3332. Thereby, the level of water in the tank can be maintained constant such that it is prevented from being increased to a predetermined level or more, whereby back pressure can be fundamentally prevented from increasing.

Furthermore, the present invention may include technical constructions for fundamentally preventing the elements of the automatic washing unit 30 from being damaged by frequently colliding with the body 10 or the filter 20 while the automatic washing unit 30 is operated to backwash the filter 20 to remove foreign substances from the filter 20. In detail, as shown in FIGS. 4 and 8, a separate stopper 3221 is provided on a predetermined portion of the core 322 of the suction unit 320, that is, at a position lower than the lowermost suction rod 321 attached to the core 322 at a position higher than the uppermost suction rod 321. When the stopper 3221 comes into contact with the body 10, the upward or downward movement of the core 322 is limited so that the corresponding suction rod 321 can be prevented from colliding with the body 10.

As stated above, in the suction unit 320, in order to backwash the filter 20 to remove foreign substances, etc. therefrom, the core 322 is operated in conjunction with the rotation and vertical movement of the drive shaft 312, and the suction rods 321 attached to the core 322 rotate and vertically move with respect to the inner circumferential surface of the filter 20 and suck foreign substances that have adhered to the inner circumferential surface of the filter 20. Here, if the cover 322 moves an excessive distance upwards or downwards, the lowermost suction rod 321 provided on the core 322 collides with the body 10, that is, the partition 140 of the post-filtering chamber 162, or the uppermost suction rod 321 collides with the body 10, that is, the top surface 130 of the post-filtering chamber 162, thus causing the suction rod to be damaged. To more fundamentally prevent this problem, the separate stopper 3221 (refer to FIG. 8) is provided on the core 322 of the suction unit 320 at a predetermined position, that is, at a position lower than the lowermost suction rod 321 attached to the core 322, so that when the stopper 3221 comes into contact with the body 10, that is, the partition 140, during downward movement of the core 322, the stopper 3221 restricts further downward movement of the core 322, thus preventing the lowermost suction rod 321 from colliding with the body 10 and being damaged. For reference, although an example of the stopper that is provided at a position higher than the uppermost suction rod 321 attached to the core 322 is not shown in FIG. 4, as needed, an additional stopper 3221 may be provided on the core 322 at a position higher than the uppermost suction rod 32. Here, because each stopper 3221 comes into contact with the partition 140 or the top surface 130, a means for preventing damage resulting from this contact event is required. For this reason, in this embodiment, as shown in FIG. 8, a separate bushing 143 is provided on a portion of the partition 140 that is brought into contact with the stopper 3221. In addition, the stopper 3221 is made of metal, and the bushing 143 is made of nonmetal, particularly, plastic such as self-lubricating plastic, polypropylene (PP), nylon, etc. Thereby, despite frequent contacts or collisions, the stopper 3221, the partition 140 or the bushing 143 can be prevented from being damaged.

As shown in FIGS. 4 and 9, besides the contact means 313 and the first limit switches 314 of the drive unit 310, the present invention further includes a pair of second limit switches 315 which are respectively provided at positions higher and lower than the first limit switches 314 with a spacing distance greater than the spacing distance between the first limit switches 314 and sets a vertical movement limit section of the core 322 of the suction unit 320. Occasionally, the contact means 313 may move over the distance between the first limit switches 314. In this case, the second limit switches 315 detect this event and double-limit the movement of the core 322 of the suction unit 320, thus preventing the suction unit 320, in detail, the suction rods 321, from colliding with the body 10 and being damaged.

In detail, as described above, to specify the vertical movement distance range of the drive shaft 312, the drive unit 310 is configured in such a way that the separate contact means 313 is attached to the drive shaft 312, and the two first limit switches 314 are disposed at positions spaced apart from each other by a predetermined distance (W1, this corresponds to the vertical movement distance range of the drive shaft 312) with the contact means 313 disposed therebetween. Thereby, during vertical movement of the drive shaft 312, if the contact means 313 comes into contact with the lower first limit switch 314, the movement direction of the drive shaft 312 is converted such that it is moved upwards and, in contrast, if the contact means 313 comes into contact with the upper first limit switch 314, the movement direction of the drive shaft 312 is converted such that it is moved downwards. However, even in this case, for reason of occurrence of malfunction attributable to frequent contact between the contact means 313 and the first limit switch 314 or abnormality of a control signal of the control unit (not shown), the contact means 313 may move over the first limit switch 314 and continue to move. If such an event occurs, the corresponding suction rod 321 of the suction unit 320 cannot be prevented from colliding with the body 10 and being damaged. To fundamentally prevent this problem, in the present invention, as shown in FIG. 9, the two additional second limit switches 315 are respectively provided at positions higher and lower than the first limit switches 314 with a spacing distance greater than the spacing distance between the first limit switches 314 (the distance W2 between the second limit switch 315 must be within a range in which the suction rods 321 of the core 322 can be prevented from coming into contact with the body 10). Of the two second limit switches 315, the upper second limit switch 315 is disposed at a position higher than the position of the upper first limit switch 314 of the two first limit switches 314. The lower second limit switch 315 is disposed at a position lower than the position of the lower first limit switch 314 of the two first limit switches 314. Thus, as shown in FIG. 9, even if the contact means 313 passes over the lower first limit switch 314 and continues to move downwards, when the contact means 313 comes into contact with the lower second limit switch 315, the second limit switch 315 transmits a contact signal to the control unit (not shown). Then, the control unit controls the drive shaft 312 provided with the contact means 313 such that it no longer moves downwards. Here, a circuit by which the second limit switch 315 is connected to the control unit (not shown) is independent from a circuit by which the first limit switch 314 is connected to the control unit (not shown). Even if the contact means 313 passes over the first limit switch 314 and continues to move attributable to a malfunction of the circuit between the first limit switch 314 and the control unit (not shown), the circuit between the second limit switch 315 and the control unit (not shown) can be maintained in the normal state. Upon being brought into contact with the contact means 313, the second limit switch 315 transmits a contact signal to the control unit (not shown) to control the drive shaft 312 provided with the contact means 313 such that it no longer moves downwards.

The second limit switches 315 are disposed at a side opposite to the respective first limit switches 314 so that even when a vertical spacing between each first limit switch 314 and the corresponding second limit switch 315 is relatively small, the second limit switch 315 can correctly sense the contact means 313. In other words, in the case where the second limit switches 315 are disposed at the same side as the first limit switches 314, if a spacing between each second limit switch 315 and the corresponding first limit switch 314 is not sufficient, when the contact means 313 passes over the first limit switch 314, interference between the first limit switch 314 and the second limit switch 315 is caused even before the contact means 313 comes into contact with the second limit switch 315. In this case, the second limit switch 315 cannot correctly sense the contact means 313. To avoid this problem, as shown in FIG. 9, the second limit switches 315 are disposed at the side opposite to the first limit switches 314. Then, even when the vertical spacing between each second limit switch 315 and the corresponding first limit switch 314 is relatively small (in other words, even in the case where the distance between the body 10 and the uppermost or lowermost suction rod 321 is relatively small when the suction rods 321 are disposed at the lowermost position or the uppermost position to backwash the filter 20), the corresponding second limit switch 315 can correctly sense the contact means 313 without being impeded by the first limit switch 314, thus reliably preventing the possibility of the suction rods 321 colliding with the body 10 and being damaged.

Furthermore, in the present invention, as shown in FIGS. 4 and 10, a diameter L1 of the suction hole 3211 of each suction rod 321 is equal to or greater than a lead L2 to which the suction rod 321 vertically moves when making a turn. Thereby, the suction rods 321 rotate around the core and are able to smoothly backwash all portions of the inner surface of the filter in such a way that backwashed portions are partially overlapped with each other, thus improving the filter backwashing efficiency and preventing the suction rods 321 from being damaged.

That is, during the filter backwashing process in which the suction rods 321 that are radially attached to the core 322 at positions spaced apart from each other at regular intervals move in conjunction with the rotation and vertical movement of the core 322 and suck foreign substances to remove them from the inner circumferential surface of the filter 20, as shown in (1) of FIG. 10, if the lead L2 to which the suction rod 321 moves upwards when making a turn is greater than the diameter L1 of the suction hole 3211 of the suction rod 321 through which foreign substances are sucked, foreign substances remain on the inner surface of the filter, rather than being sucked away, on an area corresponding to a distance L3 that is obtained by subtracting the diameter L1 of the suction hole 3211 from the lead L2 to which the suction rod 321 moves upwards when making a turn. Furthermore, because a suction area of the inner surface of the filter 20 on which the suction rod 321 sucks away foreign substances while moving a lead is not overlapped, foreign substances re-adhere to even the suction area of the filter 20 over which the suction rod 321 has passed, during the continuous filtering process (even during the filter backwashing process, the filtering process continues without stopping). Later, when the suction rod 321 moves downwards again, the suction rod 321 may collide with the foreign substances that have remained (because foreign substances continue to adhere to the filter even during the suction process of the suction rod 321, if removal of these foreign substances is neglected, the thickness of the foreign substances becomes further increased) and with foreign substances that newly adhere to the filter. If this is repeated over and over again, the possibility of the suction rod 321 being damaged increases. In addition, the filtering efficiency is reduced because of such foreign substances that adhere to the filter.

To avoid the above problems, in the present invention, as shown in (2) of FIG. 10, the diameter L1 of the suction hole 3211 of the suction rod 321 is almost equal to or greater than the lead L2 to which the suction rod 321 moves upwards when making a turn. Thus, during the operation of the automatic washing unit 30 to remove foreign substances from the filter 20, because the lead L2 to which the suction rod 321 moves upwards when making a turn is equal to or less than the diameter L1 of the suction hole 3211 through which foreign substances are sucked into the suction rod 321, when the suction rod 321 moves upwards when making a turn, there is no portion of the inner circumferential surface of the filter 20 where foreign substances can remain after being sucked by the suction rod 321. Furthermore, in the case where the diameter L1 of the suction hole 3211 is greater than the lead L2, the suction area of the filter 20 on which the suction rod 321 sucks foreign substances is overlapped. Thus, all areas of the inner circumferential surface of the filter 20 can be backwashed without leaving remaining foreign substances, or some areas are doubly involved in the suction operation. Therefore, later, when the suction rod 321 moves downwards and rotates around the core 322, unlike the conventional technique, the suction rod 321 can be prevented from colliding with foreign substances that have remained on the filter 20. Therefore, when the filter 20 of each filtering unit is backwashed, the suction rods 321 which suck foreign substances can be fundamentally prevented from being damaged by frequent collisions with foreign substances that have not been removed. In addition, the amount of foreign substances adhering to the filter can be minimized, whereby the filtering efficiency can be improved.

In the present invention, as shown in FIG. 11, the distance L4 between the adjacent suction rods 321 connected to the core 322 is equal to or less than the vertical movement distance range L5 of the core 322 so that when the core 322 moves upwards or downwards, all areas of the filter between the suction rods 321 can be backwashed, thus enhancing the filter backwashing efficiency and the filtering efficiency, and preventing the suction rods 321 from be damaged.

In detail, if the distance L4 between the adjacent suction rods 321 connected to the core 322 is greater than the vertical movement distance range L5 of the core 322, when the core 322 moves upwards to backwash the filter 20 and remove foreign substances therefrom, foreign substances are not removed on an area of the filter 20 between the adjacent suction rods 321. In this case, later, when the core 322 moves downwards again, the suction rods 321 collide with the remaining foreign substances. If this is repeated over and over again, the possibility of the suction rod 321 being damaged increases, and the filtering efficiency is reduced. To avoid the above problems, in the present invention, the distance L4 between the adjacent suction rods 321 connected to the core 322 is equal to or less than the vertical movement distance range L5 of the core 322. Then, while the core 322 moves upward, areas of the filter 20 that are respectively backwashed by the adjacent suction rods 321 are partially overlapped with each other, so that all areas of the filter 20 can be backwashed. Therefore, later, when the core 322 moves downwards, unlike the conventional technique, the suction rods 321 can be prevented from colliding with foreign substances that have remained on the filter 20. Therefore, when the filter 20 of each filtering unit is backwashed, the suction rods 321 which suck foreign substances can be fundamentally prevented from being damaged by frequent collisions with foreign substances that have not been removed. The problem of deterioration in the filtering efficiency attributable to the remaining foreign substances can be prevented.

As shown in FIGS. 4 and 12, the filtering device according to the present invention further includes a first pressure sensor 40 which measures the pressure in the body 10, and a second pressure sensor 50 which is installed in each filtering unit and measures the pressure in the corresponding filter 20. Under control of the control unit (not shown), if there are filtering units the internal pressures of which differ from the pressure in the body 10 by a predetermined level or more, the automatic washing units 30 of the corresponding filtering units are sequentially operated so as to prevent back pressure of each filtering unit from increasing during the backwashing process, thus making the backwashing process reliable.

In the conventional technique, as shown in FIGS. 1 and 2, the automatic washing unit is merely operated as follows: the pressure of a side at which ballast water is drawn into the body 10, that is, the pressure of the inlet port, (pertaining to the inlet port pressure sensor d of FIGS. 1 and 2) and the pressure of a side at which ballast water is discharged from the body 10, that is, the pressure of the outlet port, (pertaining to the inlet port pressure sensor e of FIGS. 1 and 2) are measured; and when a pressure difference between both sides increases to a predetermined level (that is, the pressure in the inlet port becomes greater than the pressure in the outlet port by a predetermined level), the automatic washing unit for backwashing the filter 20 to remove foreign substances from the filter 20 is operated. If this conventional method is just applied to the multi-cage type ballast water filtering device in which the filtering units are provided in the body 10, the filtering units perform the backwashing operation using the automatic washing units 30 always at the same time. In this case, backwash water or foreign substances which are sucked from the filtering units at the same time during the backwashing process are discharged to the outside through the discharge pipe at one time. Thus, a flow rate of backwash water and foreign substances that flow along the discharge pipe is sharply increased, or the foreign substances may block the passage of the discharge pipe, resulting in an increase of the back pressure. As a result, the filter backwashing operation using the automatic washing units 30 cannot be smoothly conducted.

Given this, in the present invention, as shown in FIG. 12, each of the filtering units installed in the body 10 of the filtering device is provided with the second pressure sensor 50 which measures the pressure in the corresponding filter 20. Thus, the internal pressure of the filter 20 of each filtering unit that is measured by the corresponding second pressure sensor is individually compared to the internal pressure of the post-filtering chamber 162 that is measured, just before ballast water is discharged out of the post-filtering chamber 162 after having been filtered, by the first pressure sensor (40, in the drawings, although the first pressure sensor is illustrated as being provided on the top surface 130 to measure the internal pressure of the post-filtering chamber 162, the internal pressure of the post-filtering chamber 162 may be measured at a position adjacent to the outlet port 120 of the body 10). Only the filtering units that exceed, in pressure difference, a predetermined level are sequentially backwashed by the automatic washing units 30. Therefore, backwash water or foreign substances that are sucked by the automatic washing units 30 can be prevented from being concentrated in the passage of the discharge pipe 331. Thereby, the problem of back pressure being increased attributable to a sudden increase of a flow rate in the passage of the discharge pipe 331 or the passage being clogged can be solved. That is, on the assumption that four filtering units are disposed in the single body 10, if the operations of backwashing the four filtering units using the automatic washing units 30 are conducted at the same time as in the conventional technique, the amount of backwash water and foreign substances that are drawn into the passage of the discharge pipe 331 is rapidly increased, whereby the passage of the discharge pipe 331 is frequently clogged (in this case, the back pressure is excessively increased). However, if only the filtering units that exceed in a pressure difference a predetermined level are individually sequentially backwashed by the corresponding automatic washing units 30 as in the present invention, backwash water and foreign substances that move out of each filtering unit are separately drawn into the passage of the discharge pipe 331 rather than backwash water and foreign substances of all the filtering units being drawn into the passage of the discharge pipe 331 at one time. Therefore, the passage of the discharge pipe 331 can be prevented from being clogged with backwash water and foreign substances, or a phenomenon of the backwashing operation being reduced in efficiency attributable to a sudden increase in the back pressure can be reliably prevented.

As shown in FIG. 12, the second pressure sensor 50 is configured such that it can measure the pressure in the filter 20 through a pressure measurement hole 173 formed in the upper cover plate 170 that closes the filter insert hole 131 formed in the upper end of the body 10, that is, the top surface 130. Thus, repair or replacement of the second pressure sensor 50 can be conducted merely by disassembling the upper cover plate 170 from the top surface 130. The second pressure sensor 50 compares the measured pressure of the corresponding filter 20 to an internal pressure of the post-filtering chamber 162 that is measured by the first pressure sensor 40. Here, the first pressure sensor 40 may directly measure the internal pressure of the post-filtering chamber 162 through the top surface 130 of the body 10. Alternatively, the internal pressure of the post-filtering chamber 162 may be measured at a position adjacent to the outlet port 120 of the body 10. A transmitter for pressure measurement, a pressure sensor or a pressure difference switch is used as each of the first second pressure sensors 40 and 50.

For reference, in the present invention, a separate pressure sensor may be installed at a position adjacent to the inlet port 110 of the body 10 to measure the pressure in the pre-filtering chamber 161. The internal pressure of the pre-filtering chamber 161 that is measured by the separate pressure sensor installed at a position adjacent to the inlet port 110 refers to the average of the internal pressures of the filtering units (the pressure in the pre-filtering chamber 161 may be obtained by averaging values measured by the second pressure sensors 50 that measure the internal pressures of the respective filtering units). If a difference between the measured internal pressure of the pre-filtering chamber 161 and the internal pressure of the post-filtering chamber 162 that is measured by first pressure sensor 40 exceeds a predetermined level, this means that a pressure difference in the body 10 reaches a dangerous level. In this case, all the filtering units conduct the filter backwashing operation at the same time such that a pressure difference in the body 10 is at a stable level.

In the present invention, as shown in FIGS. 4, 6 and 13, a drain line 180 on which a separate control valve 181 is installed is provided under the lower end of the body 10. When the operation of the filtering device is interrupted, ballast water that is in the body 10 is drained out of the body 10 through the drain line 180 so that the inner surface of the body 10 can be prevented from corroding with stagnant ballast water.

Given the fact that the ballast water filtering device of the present invention is installed in a ship, the case where the operation of the ballast water filtering device is interrupted is frequently caused and, for example, the ship may be anchored for a long period of time. As such, when the filtering device is not in use for a long period of time, if ballast water is left in the body 10 of the filtering device, the inner surface of the body 10 easily corrodes due to characteristics of ballast water containing salt, thus affecting the durability of the body 10.

Therefore, in the present invention, as shown in FIGS. 4, 6 and 13, the drain line 180 provided with the separate control valve 181 (for reference, the control valve 181 may be omitted) is additionally provided in the body 10, in detail, under the bottom surface 150 that is the lower end of the body 10. As such, in the case where the filtering device is not in use for a long period of time, the control valve 181 of the drain line 180 that is provided under the body 10, in detail, under the bottom surface 150 that is at the lowest position of the pre-filtering chamber 161, is opened such that ballast water that is in the pre-filtering chamber 161 and the post-filtering chamber 162 can be drained to the outside through the drain line 180. Thereby, ballast water is completely discharged out of the pre-filtering chamber 161 and the post-filtering chamber 162 of the body 10 without remaining therein. Therefore, the present invention can fundamentally prevent the conventional problem of the inner surface of the body 10 corroding with salty ballast water that remains in the body 10. With regard to the installation position of the drain line 180, it is preferable that the drain line 180 be connected to the lowest portion of the bottom surface 150.

Besides including the drain line 180 provided under the lower end of the body 10, the present invention further includes an air injection unit 190 which is provided on the upper end of the body 10 so as to inject air into the body 10. When ballast water that has been in the body 10 is drained to the outside through the drain line 180, the air injection unit 190 injects air into the body 10, thus removing foreign substances from the inner surface of the body 10.

In detail, as shown in FIGS. 4, 5 and 13, the air injection unit 190 (which is connected to a compressor or the like for providing air or compressed air thereto such that air or compressed air can be injected into the body 10, and which may include a control on/off valve for determining whether to inject air into the body 10) is provided on the uppermost end of the body 10, that is, the top surface 130 of the body 10, so as to inject air into the body 10. When ballast water that has been in the body 10 is drained to the outside through the drain line 180, air or compressed air is injected into the body 10 through the air injection unit 190 so that the ballast water can be rapidly drained out of the body 10 through the drain line 180. By virtue of injection of air into the body 10 through the air injection unit 190, ballast water that has been stagnant in the post-filtering chamber 162 can be moved into the pre-filtering chamber 161 via the filters 20 and the ballast water supply holes 141 formed in the filters 20, before being drained to the outside through the drain line 180. At this time, foreign substances, etc. that have adhered to the inner surface of the body 10 are detached therefrom by pressure of air injected into the body 10 by the air injection unit 190 and are discharged along with the ballast water out of the body 10. A separate element capable of injecting compressed air into the body 10 is preferably used as the air injection unit 190. As needed, a vent or the like, through which air is discharged out of the body 10 so that ballast water can be more smoothly discharged through the drain line 180, may be used as the air injection unit 190.

Furthermore, in the present invention, as shown in FIGS. 4, 6 and 14, a second drain line 3321 provided with a second control valve 33211 is provided under a lower portion of the backwash line 332. When the operation of the filtering device is interrupted, ballast water that is in the backwash line 332 can be completely drained to the outside through the second drain line 3321. Thereby, the inner surface of the backwash line 332 can be prevented from corroding with stagnant ballast water.

In detail, as stated above, because the ballast water filtering device of the present invention is installed in a ship, the case where the operation of the ballast water filtering device is interrupted is frequently caused and, for example, the ship may be anchored for a long period of time. As such, when the filtering device is not in use for a long period of time, if ballast water is left in the backwash line 332 or the discharge pipes 331 of the automatic washing units 30 which are used to backwash the filters 20, the inner surfaces of the discharge pipes 331 or the inner surface of the backwash line 332 easily corrodes due to characteristics of ballast water containing salt, thus affecting the durability of the discharge pipes 331 or the backwash line 332.

Therefore, in the present invention, as shown in FIGS. 4, 6 and 14, the second drain line 3321 provided with the separate second control valve 33211 is additionally provided in the lower portion of the backwash line 332 which communicates with the discharge pipes 331 of the filtering unit so that ballast water that is in the discharge pipes 331 gathers in the single backwash line 332. As such, in the case where the filtering device is not in use for a long period of time, the second control valve 33211 of the second drain line 3321 is opened. Then, backwash water and foreign substances that are stagnant in the discharge pipes 331 of the filtering units and the backwash line 332 are drained to the outside through the second drain line 3321 which is provided under the lowest portion of the backwash line 332 through which the discharge pipes 331 of the filtering units communicate with each other such that ballast water that is in the discharge pipes 331 gathers in the single backwash line 332. Thereby, ballast water, that is, backwash water and foreign substances, are completely discharged out of the backwash line 332 connected to the discharge pipes 331 of the filtering units without remaining therein. Therefore, the present invention can fundamentally prevent the conventional problem of the inner surfaces of the discharge pipes 331 of the filtering units or the inner surface of the backwash line 332 corroding with salty ballast water that remains in the discharge pipes 331 or the backwash line 332. With regard to the installation position of the second drain line 3321, it is preferable that the second drain line 3321 be connected to the lowest portion of the backwash line 332.

Besides including the second drain line 3321 provided under the lower portion of the backwash line 332, the present invention further includes a second air injection unit 3322 which is provided on the discharge pipe 331 of each filtering unit so as to inject air into the discharge pipe 331. When ballast water that has been in the backwash line 332 is drained to the outside through the second drain line 3321, the second air injection unit 3322 injects air into the discharge pipe 331, thus removing foreign substances from the inner surface of the discharge pipe 331.

In detail, as shown in FIGS. 4, 5 and 14, the second air injection unit 3322 (which is connected to a compressor or the like for providing air or compressed air thereto such that air or compressed air can be injected into the discharge pipe 331, and which may include a control on/off valve for determining whether to inject air into the discharge pipe 331) is provided on the discharge pipe 331 of each filtering unit so as to inject air into the discharge pipe 331. When ballast water, foreign substances, etc. that have been in the discharge pipes 331 and the backwash line 332 are drained to the outside through the second drain line 3321, air or compressed air is injected into the discharge pipe 331 of each filtering unit through the second air injection unit 3322 so that the ballast water, foreign substances, etc. can be rapidly drained out of the discharge pipe 331 and the backwash line 332 through the second drain line 3321. By virtue of pressure of air injected into the discharge pipe 331 through the second air injection unit 3322, foreign substances, etc. that have adhered to the inner surface of the discharge pipe 331 are detached therefrom and are discharged along with ballast water to the outside. Turning on/off the second control valve 33211 of the second drain line 3321 and/or injecting air into the discharge pipe 331 through the second air injection unit 3322 can be automatically controlled by the control unit (not shown).

In the present invention, as shown in FIGS. 4, 15 and 17, the upper end of each filter 20 is coupled to the top surface 130 of the body 10, and the lower end thereof is coupled to the partition 140 of the body 10. Coming into direct contact with the body 10, a seat 210 is attached to each of the upper and lower ends of the filter 20.

Referring to FIG. 16, in the conventional technique, to maintain airtightness for the junction between the upper end of the filter 20 and the body 10 (this can also be applied in the same manner to maintain airtightness for the junction between the lower end of the filter 20 and the body 10), a separate rubber packing (f, as shown in FIG. 16, having a '⊓'-shaped cross-section) is interposed between an upper seat 210 of the filter 20 and a downward protrusion 171 of the upper cover plate 170 which covers the filter insert hole 131 formed in the top surface 130 of the body 10, rather than the upper seat 210 coming into direct contact with the downward protrusion 171 of the upper cover plate 170. In more detail, the rubber packing f is provided in such a way that the upper seat 210 is covered with the rubber packing f. However, in the conventional technique, as the amount of foreign substances, etc. adhering to the inner circumferential surface of the filter 20 increases, the internal pressure of the filter 20 is increased, and the external pressure of the filter 20 is relatively reduced, whereby pressure of ballast water to come out of the filter 20 is increased, and pressure of ballast water to come out of the filter 20 through the junction between the upper end of the filter 20 and the body 10 is also increased. Due to this, a problem of the rubber packing f that covers the upper seat 210 of the filter 20 being removed from the filter 20 by the pressure is frequently caused. In this case, ballast water that has not been filtered leaks out of the filter 20 through a space which is formed on the upper end of the filter 20 by the removal of the rubber packing f (of course, the same problem also occurs on the lower end of the filter 20).

In the present invention, to avoid the above conventional problem derived from the conventional coupling structure between the filter 20 and the body 10, as show in FIGS. 4 and 15, a separate O-ring 60 is provided on contact surfaces between the upper seat 210 of the filter 20 and the upper cover plate 170 of the body 10 so that ballast water that has been not filtered can be prevented from leaking out of the filter 20 through a space between the filter 20 and the body 10, in detail, between the filter 20 and the downward protrusion 171 of the upper cover plate 170, due to filtration pressure (that is, a pressure difference between the interior and exterior of the filter 20).

In the present invention, unlike the conventional technique, in lieu of using the rubber packing f that covers the seat 210 of the filter 20, the seat 210 fastened to the filter 20 comes into contact with the body 10, that is, the downward protrusion 171 of the upper cover plate 170. Merely, a separate O-ring 60 is disposed on contact surfaces between the seat 210 and the downward protrusion 171 of the upper cover plate 170. The O-ring 60 prevents ballast water that has not been filtered by the filter 20 from leaking out of the filter 20 through a space between the seat 210 and the downward protrusion 171 of the upper cover plate 170. The O-ring 60 is disposed in a recess formed in the seat 210 or the downward protrusion 171 of the upper cover plate 170. Hence, unlike the conventional rubber packing, the O-ring 60 can be reliably prevented from being removed from the filter 20 even by filtration pressure in the filter 20.

In this embodiment, as shown in FIG. 15, with regard to the upper end of the filter 20, an O-ring recess 172 is formed in the downward protrusion 171 of the upper cover plate 170, and the O-ring 60 is seated in the O-ring recess 172. Therefore, because the O-ring 60 is allowed to be replaced with a new one by separating only the upper cover plate 170 from the device, the replacement of the O-ring 60 can be facilitated.

That is, as stated above, in the case where the O-ring 60 that is used to maintain a seal around the upper end of the filter 20 is disposed in the O-ring recess 172 which is formed in the downward protrusion 171 of the upper cover plate 170, when replacement or maintenance work of the O-ring 60 is required, the O-ring 60 is allowed to be removed from the downward protrusion 171 and replaced with a new one by separating only the upper cover plate 170 from the body 10. Therefore, replacement work of the O-ring 60 can be conveniently conducted in a short time. Unlike the case of FIG. 15, if the O-ring recess 172 is formed in the upper seat 210 of the filter 20, when the replacement of the O-ring 60 is required, additional work of removing the filter 20 from the body 10 must be conducted after the upper cover plate 170 has been separated from the body 10 (Even if the replacement of the O-ring 60 becomes possible without removing the filter 20 from the body 10, a worker must conduct the replacement work on the upper surface of the body 10 through the filter insert hole 131. It is clear that conducting this work is not easy given the fact that the space above the filtering device is not sufficient due to the characteristics of ships). Therefore, the replacement or maintenance work of the O-ring 60 is complicated and requires a lot of time. Given this, in the present invention, the O-ring recess 172 in which the O-ring 60 is positioned is formed in the downward protrusion 171 of the upper cover plate 170 so that the replacement or maintenance work can be conveniently and rapidly conducted.

Meanwhile, unlike the case of the upper end of the filter 20, in the case of the lower end of the filter 20, as shown in FIG. 17, the lower seat 210 of the filter 20 comes into a protrusion 142 which encloses the ballast water supply hole 141 formed in the partition 140 of the body 10, and an O-ring 60 is disposed in a second O-ring recess 211 formed in the lower seat 210 of the filter 20. Thus, because the O-ring 60 is allowed to be replaced with a new one by separating only the filter 20 from the body 10, replacement work of the O-ring 60 can be facilitated.

In detail, the lower seat 210 attached to the lower end of the filter 20 is brought into contact with the protrusion 142 which protrudes from the partition 140 of the body 10 and encloses the ballast water supply hole 141. Unlike the case of the upper end of the filter 20, the second O-ring recess 211, in which the O-ring 60 can be stably disposed to create a seal at the interface between the lower seat 210 of the filter 20 and the protrusion 142, is formed in the lower seat 210 of the filter 20. In this case, when replacement or maintenance work of the lower O-ring 60 of the filter 20 is required, if only the filter 20 is separated from the body 10, the O-ring 60 disposed in the second O-ring recess 211 formed in the lower seat 210 of the filter 20 is allowed to be removed from the filter 20 and replaced with a new one. Therefore, the replacement work of the O-ring 60 can be easily conducted in a short time. Unlike the case of FIG. 17, if the O-ring recess 211 is formed in the protrusion 142 that protrudes from the partition 140 of the body 10 and encloses the ballast water supply hole 141, when the replacement work of the O-ring 60 is required, the suction unit 320 must not only be separated from the body 10 after the upper cover plate 170 and the filter 20 have been removed from the body 10, but the worker must also enter the body 10, which is small, and conduct the replacement work in the body 10. In this case, the replacement or maintenance work of the O-ring 60 disposed around the lower end of the filter 20 is complicated and requires a lot of time. Given this, in the present invention, the second O-ring recess 211 in which the O-ring 60 related to the lower end of the filter 20 is positioned is formed in the lower seat 210 of the filter 20. In this case, if only the filter 20 is separated from the body 10, because the O-ring 60 along with the filter 20 is removed from the body 10, the replacement work of the O-ring 60 can be easily conducted outside the body 10 in a short time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A multi-cage type ballast water filtering device having a back pressure prevention structure, the device comprising:
   a body having an inlet port and an outlet port through which ballast water is drawn into and discharged from the body; and
   a plurality of filtering units connected to each other to form a packaged structure in the body,
   wherein each of the filtering units comprises:
      a filter filtering ballast water that flows through the body; and
      an automatic washing unit backwashing the filter to remove foreign substances adhering to the filter,
      the automatic washing unit comprises:
         a drive unit operating the automatic washing unit in response to a signal of a control unit;
         a suction unit connected to and moved by the drive unit, the suction unit sucking the foreign substances from the filter; and
         a discharge unit discharging the foreign substances sucked by the suction unit, the discharge unit disposed in a lower part of the body, wherein the discharge unit and the filtering units are arranged such that the foreign substances sucked from the filtering units move to the discharge unit in a direction of gravity, and
      the discharge unit comprises:
         a discharge pipe passing through a bottom surface of the body and protruding outward from the bottom surface of the body, wherein at least a portion of the drive unit and at least a portion of the discharge pipe are disposed on opposing ends of the body so as to be separated by the body,
         a backwash line in fluid communication with the discharge pipe, and
         a back pressure prevention tank provided on the backwash line, wherein the back pressure prevention tank is larger than the backwash line so that backwash water and foreign substances delivered to the discharge unit from the suction unit are primarily stored in the back pressure prevention tank, whereby back pressure in the backwash line is prevented from increasing.

2. The multi-cage type ballast water filtering device having a back pressure prevention structure of claim 1, wherein the back pressure prevention tank is provided on the single backwash line formed by communicating discharge pipes of the filtering units with each other below the body.

3. The multi-cage type ballast water filtering device having a back pressure prevention structure of claim 1, wherein the back pressure prevention tank is configured such that an outlet through which backwash water is discharged from the back pressure prevention tank is disposed lower than an inlet through which backwash water is drawn into the back pressure prevention tank, whereby a water level in the back pressure prevention tank is maintained lower than the inlet so as to prevent the back pressure in the backwash line from increasing.

4. The multi-cage type ballast water filtering device having a back pressure prevention structure of claim 3, wherein the back pressure prevention tank comprises: a water level sensor measuring the water level in the tank; and a pump discharging backwash water from the back pressure prevention tank when the water level measured by the water level sensor is a predetermined level or more, whereby the water level in the tank is maintained at the predetermined level or less so as to prevent the back pressure in the backwash line from increasing.

5. The multi-cage type ballast water filtering device having a back pressure prevention structure of claim 1, wherein the suction unit comprises a suction rod sucking the foreign substances adhering to the filter, and a core connected to the suction rod and functioning as a rotating shaft for rotating the suction rod, with a stopper provided at a predetermined position on the core so that when the stopper comes into contact with the body, vertical movement of the core is limited, whereby the suction rod is prevented from colliding with the body and being damaged.

6. The multi-cage type ballast water filtering device having a back pressure prevention structure of claim 5, wherein a bushing is provided on a portion of the body that is brought into contact with the stopper, wherein the stopper is made of metal, and the bushing is made of nonmetal, whereby the stopper or the body is prevented from being damaged due to a contact between the stopper and the body.

7. The multi-cage type ballast water filtering device having a back pressure prevention structure of claim 1, wherein the drive unit comprises: a drive shaft rotated and vertically moved by a drive motor; a contact means provided at a predetermined position on the drive shaft; a pair of first limit switches provided at positions spaced apart from each other by a predetermined distance corresponding to a vertical movement distance range of the suction unit, the first limit switches being brought into contact with the contact means; and a pair of second limit switches respectively provided at positions higher and lower than the first limit switches with a spacing distance greater than the spacing distance between the first limit switches, the second limit switches setting a vertical movement limit section of the suction unit,
   wherein when the contact means moves over the spacing distance between the first limit switches, the second limit switches double-limit the movement of the suction unit so that the suction unit is prevented from colliding with the body and being damaged.

8. The multi-cage type ballast water filtering device having a back pressure prevention structure of claim 7, wherein the second limit switches are disposed facing the respective first limit switches so that even when a vertical spacing distance between each of the first limit switches and the corresponding second limit switch is small, the second limit switch can correctly sense the contact means.

9. The multi-cage type ballast water filtering device having a back pressure prevention structure of claim 1, wherein the suction unit comprises: a suction rod sucking the foreign substances adhering to the filter; and a core connected to the suction rod and functioning as a rotating shaft interlocked with the drive unit to rotate the suction rod,
   wherein the suction rod has a suction hole having a diameter substantially equal to or greater than a distance which the suction rod vertically moves when making a turn, whereby the suction rod rotates around the core and is able to backwash all portions of an inner surface of the filter to remove the foreign substances from the filter in such a way that backwashed portions are partially overlapped with each other, thus enhancing filter backwashing efficiency and preventing the suction rod from being damaged.

10. The multi-cage type ballast water filtering device having a back pressure prevention structure of claim 1, further comprising:
a first pressure sensor measuring an internal pressure of the body; and
a second pressure sensor installed in each of the filtering units, the second pressure sensor measuring an internal pressure of the filter of the corresponding filtering unit,
wherein under control of the control unit, when there are filtering units which have internal pressures that differ from the internal pressure of the body by a predetermined level or more, the automatic washing units of the corresponding filtering units are sequentially operated so as to prevent back pressures of the filtering units from increasing during a backwashing process, thus making the backwashing process reliable.

11. The multi-cage type ballast water filtering device having a back pressure prevention structure of claim 10, wherein the second pressure sensor measures the internal pressure of the filter through a pressure measurement hole formed in the upper cover plate that closes a filter insert hole formed in an upper end of the body.

12. The multi-cage type ballast water filtering device having a back pressure prevention structure of claim 1, wherein a first drain line is provided under the body so that when operation of the filtering device is interrupted, ballast water that is in the body is drained out of the body through the first drain line so as to prevent an inner surface of the body from corroding with stagnant ballast water, and
a first air injection unit is provided on an upper end of the body so as to inject air into the body so that when the ballast water that is in the body is drained through the first drain line, the first air injection unit injects air into the body, thus removing foreign substances from the inner surface of the body.

13. The multi-cage type ballast water filtering device having a back pressure prevention structure of claim 1, wherein a second drain line is formed under a lower portion of the backwash line formed by the discharge pipes so that when operation of the filtering device is interrupted, ballast water that is in the backwash line is drained through the second drain line so as to prevent an inner surface of the backwash line from corroding with stagnant ballast water, and
a second air injection unit is provided on each of the discharge pipes so as to inject air into the discharge pipe so that when the ballast water that is in the backwash line is drained through the second drain line, the second air injection unit injects air into the discharge pipe, thus removing foreign substances from an inner surface of the discharge pipe.

14. The multi-cage type ballast water filtering device having a back pressure prevention structure of claim 1, wherein an upper end of the filter is coupled to a top surface of the body, and a lower end of the filter is coupled to a partition of the body,
a seat is attached to each of the upper and lower ends of the filter, the seat being placed on the body while making direct contact with the body, and
an O-ring is provided between contact surfaces of the seat and the body so that ballast water that has been filtered in the filter is prevented from leaking out of the filter due to filtration pressure through space between the contact surfaces of the filter and the body.

15. The multi-cage type ballast water filtering device having a back pressure prevention structure of claim 14, wherein the seat provided on the upper end of the filter comes into contact with a downward protrusion of an upper cover plate that covers a filter insert hole formed in the top surface of the body, and
the corresponding O-ring is disposed in a first O-ring recess formed in the downward protrusion of the upper cover plate, so that the O-ring is allowed to be replaced with another by separating only the upper cover plate from the body, whereby replacement of the O-ring can be facilitated.

16. The multi-cage type ballast water filtering device having a back pressure prevention structure of claim 14, wherein the seat provided on the lower end of the filter comes into contact with a protrusion enclosing a ballast water supply hole formed in the partition of the body, and
the corresponding O-ring is disposed in a second O-ring recess formed in the seat provided on the lower end of the filter, so that the O-ring is allowed to be replaced with another by separating only the filter from the body, whereby replacement of the O-ring can be facilitated.

17. The multi-cage type ballast water filtering device having a back pressure prevention structure of claim 1, further comprising:
the body bounding a chamber, the ballast water being drawn into and discharged from the chamber of the body through the inlet port and an outlet port;
a partition disposed within the chamber of the body, the partition dividing the chamber into a pre-filtering chamber and a post-filtering chamber, the inlet port communicating with the pre-filtering chamber and the outlet port communicating with the post-filtering chamber; and
the discharge pipe passing through the pre-filtering chamber.

* * * * *